(12) United States Patent
Soldevila et al.

(10) Patent No.: US 10,635,949 B2
(45) Date of Patent: Apr. 28, 2020

(54) LATENT EMBEDDINGS FOR WORD IMAGES AND THEIR SEMANTICS

(71) Applicant: Xerox Corporation, Norwalk, CT (US)

(72) Inventors: Albert Gordo Soldevila, Grenoble (FR); Jon Almazán Almazán, Grenoble (FR); Naila Murray, Grenoble (FR); Florent C. Perronnin, Domène (FR)

(73) Assignee: XEROX CORPORATION, Norwalk, CT (US)

( * ) Notice: Subject to any disclaimer, the term of this patent is extended or adjusted under 35 U.S.C. 154(b) by 253 days.

(21) Appl. No.: 14/793,374

(22) Filed: Jul. 7, 2015

(65) Prior Publication Data

US 2017/0011279 A1    Jan. 12, 2017

(51) Int. Cl.
*G06K 9/66* (2006.01)
*G06F 17/30* (2006.01)
*G06K 9/72* (2006.01)
*G06K 9/62* (2006.01)
*G06F 16/583* (2019.01)
*G06K 9/00* (2006.01)
*G06N 3/08* (2006.01)
*G06N 3/04* (2006.01)

(52) U.S. Cl.
CPC .......... *G06K 9/66* (2013.01); *G06F 16/5846* (2019.01); *G06K 9/00852* (2013.01); *G06K 9/6202* (2013.01); *G06N 3/04* (2013.01); *G06N 3/084* (2013.01)

(58) Field of Classification Search
None
See application file for complete search history.

(56) References Cited

U.S. PATENT DOCUMENTS

| | | | |
|---|---|---|---|
| 9,552,549 B1* | 1/2017 | Gong | G06N 3/084 |
| 2008/0027925 A1* | 1/2008 | Li | G06F 17/30864 |
| 2013/0060786 A1 | 3/2013 | Rodriguez-Serrano et al. | |
| 2013/0290222 A1 | 10/2013 | Gordo et al. | |
| 2014/0219563 A1 | 8/2014 | Rodriguez-Serrano et al. | |
| 2014/0267301 A1* | 9/2014 | Yang | G09G 5/24 345/467 |
| 2015/0104073 A1 | 4/2015 | Rodriguez-Serrano et al. | |
| 2016/0125274 A1* | 5/2016 | Zhou | G06K 9/66 382/160 |

(Continued)

OTHER PUBLICATIONS

Bian et al. "Biased Discriminant Euclidean Embedding for Content-Based Image Retrieval", IEEE Transactions on Image Processing, vol. 19, No. 2, Feb. 20.*

(Continued)

*Primary Examiner* — Jiangeng Sun
(74) *Attorney, Agent, or Firm* — Fay Sharpe LLP

(57) ABSTRACT

A system and method enable semantic comparisons to be made between word images and concepts. Training word images and their concept labels are used to learn parameters of a neural network for embedding word images and concepts in a semantic subspace in which comparisons can be made between word images and concepts without the need for transcribing the text content of the word image. The training of the neural network aims to minimize a ranking loss over the training set where non relevant concepts for an image which are ranked more highly than relevant ones penalize the ranking loss.

21 Claims, 12 Drawing Sheets

(56) References Cited

U.S. PATENT DOCUMENTS

2016/0180151 A1* 6/2016 Philbin ............. G06K 9/00288
382/118

OTHER PUBLICATIONS

CS231n Convolutional Neural Networks for Visual Recognition, http://cs231n.github.io/convolutional-networks/, Feb. 2015.*
Tingting Wei, Yonghe Lu, Huiyou Chang, Qiang Zhou, Xianyu Bao, A semantic approach for text clustering using WordNet and lexical chains, Expert Systems with Applications, vol. 42, Issue 4, 2015, pp. 2264-2275, https://doi.org/10.1016/j.eswa.2014.10.023.*
He et al, Delving Deep into Rectifiers : Surpassing Human-Level Performance on ImageNet Classification, arXiv:1502.01852v1 [cs.CV], Feb. 6, 2015.*
Girshick et al., Rich feature hierarchies for accurate object detection and semantic segmentation, arXiv:1311.2524v5 [cs.CV] , Oct. 22, 2014.*
F. Perronnin and D. Larlus, "Fisher vectors meet Neural Networks: A hybrid classification architecture," 2015 IEEE Conference on Computer Vision and Pattern Recognition (CVPR), Boston, MA, Jun. 12, 2015, pp. 3743-3752.doi: 10.1109/CVPR.2015.7298998 (Year: 2015).*
K Simonyan, A Vedaldi, A Zisserman, Deep fisher networks for large-scale image classification—Advances in neural information processing systems, 2013 (Year: 2013).*
Andrea Frome*, Greg S. Corrado*, Jonathon Shlens*, Samy Bengio, Jeffrey Dean, Marc'Aurelio Ranzato, Tomas Mikolov , DeViSE: A Deep Visual-Semantic Embedding Model, Advances in Neural Information Processing Systems 26 (NIPS 2013).*
U.S. Appl. No. 14/793,434, filed Jul. 7, 2015, Soldevila, et al.
Rodriguez-Serrano, et al., "Label Embedding: A Frugal Baseline for Text Recognition," International Journal of Computer Vision, vol. 113, Issue 3, pp. 193-207 (Jul. 2015).
U.S. Appl. No. 14/691,021, filed Apr. 20, 2015, Florent C. Perronnin, et al.
J. Almazán, et al., "Word spotting and recognition with embedded attributes," TPAMI, pp. 2552-2566 (2014).
A. Babenko, et al., "Neural codes for image retrieval," ECCV, LCNS 8689, pp. 584-599 (2014).
A. Bissacco, et al., "PhotoOCR: Reading Text in Uncontrolled Conditions," ICCV, pp. 785-792 (2013).
K. Chatfield, et al., "Return of the devil in the details: Delving deep into convolutional nets," British Machine Vision Conference, pp. 1-12 (2014).
G. Chechik, et al., "Large Scale Online Learning of Image Similarity through Ranking," J. Machine Learning Research, 11, pp. 1109-1135 (2010), published online 2009.
A. Frome, et al. "DeViSE: A deep visual-semantic embedding model," NIPS, pp. 2121-2129 (2013).
X. Glorot, et al, "Understanding the difficulty of training deep feedforward neural networks," AISTATS, pp. 249-256 (2010).
Y. Gong, et al., "A multi-view embedding space for modeling internet images, tags, and their semantics," IJCV, 06 (2), pp. 210-233, 2013.
A. Gordo, "Supervised mid-level features for word image representation," CVPR, pp. 2956-2964 (2015).
M. Jaderberg, et al., "Deep structured output learning for unconstrained text recognition," ICLR, pp. 1-10 (2015).
M. Jaderberg, et al., "Synthetic Data and Artificial Neural Networks for Natural Scene Text Recognition," CoRR, abs/1406.2227, pp. 1-10 (2014).
M. Jaderberg, et al., "Deep Features for Text Spotting," ECCV, pp. 512-528 (2014).
Y. Jia, et al., "Caffe: Convolutional Architecture for Fast Feature Embedding," *arXiv preprint arXiv:1408.5093*, pp. 1-4 (2014).
D. Karatzas, et al., "ICDAR 2013 Robust Reading Competition," ICDAR, pp. 1484-1493 (2013).
P. Krishnan, et al., "Bringing semantics into word image retrieval," ICDAR, pp. 733-737, (2013).
A. Krizhevsky, et al., "Imagenet classification with deep convolutional neural networks," NIPS, pp. 1097-105 (2012).
Y. Lecun, et al., "Handwritten digit recognition with a backpropagation network," NIPS, pp. 396-404 (1989).
T. Mikolov, et al., "Efficient estimation of word representations in vector space," ICLR Workshop, pp. 1-9 (2013).
A. Mishra, et al., "Scene text recognition using higher order language priors," BMVC, pp. 127.1-127.11 (2012).
A. Mishra, et al., "Top-down and bottom-up cues for scene text recognition," CVPR, pp. 2687-2694 (2012).
L. Neumann, et al., "Scene Text Localization and Recognition with Oriented Stroke Detection," ICCV, pp. 97-104 (2013).
J. A. Rodríguez-Serrano et al., "Label embedding for text recognition," BMVC, pp. 1-11 (2013).
D. E. Rumelhart, et al., "Learning representations by backpropagating errors," Nature 323, pp. 533-536 (1986).
C. Shi, et al., "Scene text recognition using part-based tree-structured character detection," CVPR, pp. 2961-2968 (2013).
K. Simonyan, et al., "Very deep convolutional networks for large-scale image recognition," CoRR, abs/ arxiv 1409.1556, pp. 1-14 (2014).
Pennington, et al., "GloVe: Global Vectors for Word Representation," *EMNLP*, pp. 1532-1543 (2014).
K. Wang, et al., "End-to-end Scene Text Recognition," ICCV, pp. 1457-1464 (2011).
J. Weston, et al., "Wsabie, Scaling up to large vocabulary image annotation," Int'l Joint Conf. on Artificial Intelligence, pp. 2764-2770 (2011).
C. Yao, et al., "Strokelets: A learned multi-scale representation for scene-text recognition," CVPR, pp. 4042-4049 (2014).
J. Yosinski, et al., "How transferable are features in deep neural networks?" *NIPS*, pp. 3320-3328 (2014).
WordNet, Prineton University, downloaded at http://wordnet.princeton.edu, pp. 1-3, last updated Mar. 17, 2015.

* cited by examiner

| IMAGE | GROUND TRUTH | PREDICTIONS |
|---|---|---|
|  | scientist.n.01 | scientist.n.01<br>expert.n.01<br>science.n.01<br>intellectual.n.01<br>traveler.n.01 |
|  | worker.n.01<br>communicator.n.01<br>traveler.n.01 | traveler.n.01<br>communicator.n.01<br>worker.n.01<br>chordate.n.01<br>laborer.n.01 |
|  | creator.n.02<br>conduit.n.01 | conduit.n.01<br>creator.n.02<br>utensil.n.01<br>vessel.n.03<br>worker.n.01 |
|  | city.n.01<br>capital.n.03<br>mythical_being.n.01 | mythical_being.n.01<br>capital.n.03<br>city.n.01<br>fictional_character.n.01<br>town.n.01 |
|  | vascular_plant.n.01<br>unwelcome_person.n.01<br>contestant.n.01<br>traveler.n.01<br>sports_equipment.n.01 | sports_equipment.n.01<br>contestant.n.03<br>vascular_plant.n.01<br>traveler.n.01<br>unwelcome_person.n.01 |
|  | adult.n.01<br>religious_person.n.01<br>relative.n.01<br>female.n.02 | relative.n.01<br>religious_person.n.01<br>female.n.02<br>adult.n.01<br>peer.n.01 |

FIG. 15

| QUERY CONCEPT | RETRIEVED IMAGES |
|---|---|
| shop.n.01 | Bazaar ... pizzeria DRUGSTORE |
| musical_instrument.n.01 | Violoncello ... saxophones |
| software.n.01 | shareware ... Shoreline |
| hair.n.01 | Mustachios Eyelashes |
| imaginary_being.n.01 | SYLPH MEDEA bugbear valkyries |
| imaginary_being.n.01 + female.n.01 | ... witch ... |
| leader.n.01 + female.n.01 | MAYOR... Bachelor Sir GAFFER |
| leader.n.01 + male.n.01 | margarita HIGHBALLS Bachelor Sir amaretto Madeira |
| beverage.n.01 + alcohol.n.01 | margarita HIGHBALLS amaretto Madeira |
| beverage.n.01 − alcohol.n.01 | phosphates tea soda SMOOTHIE |

FIG. 16

LATENT EMBEDDINGS FOR WORD IMAGES AND THEIR SEMANTICS

BACKGROUND

The exemplary embodiment relates to text recognition and image retrieval based on semantic information and finds particular application in connection with assigning semantic labels to word images and to recognition of word images corresponding to semantic labels.

There has been an increasing interest in text recognition and retrieval in natural images. See, e.g., D. Karatzas, et al., "ICDAR 2013 Robust Reading Competition," ICDAR, pp. 1484-1493, 2013; K. Wang, et al., "End-to-end Scene Text Recognition," ICCV, pp. 1457-1464, 2011, hereinafter, Wang 2011. For example, given an image of a word, the word may be recognized, using a list of possible transcriptions or in an unconstrained manner. See, e.g., J. Almazán, et al., "Word spotting and recognition with embedded attributes," TPAMI, pp. 2552-2566, 2014, hereinafter, Almazán 2014; A. Gordo, "Supervised mid-level features for word image representation," CVPR, pp. 2956-2964, 2015, hereinafter, Gordo 2015; Wang 2011; A. Bissacco, et al., "PhotoOCR: Reading Text in Uncontrolled Conditions," ICCV, pp. 785-792, 2013; M. Jaderberg, et al., "Deep structured output learning for unconstrained text recognition," ICLR, 2015, hereinafter, Jaderberg 2015. Typically, a candidate word is first localized in an image. Then it is cropped, and recognized. Word image retrieval may also be performed, which is essentially the reverse process: given a query, which can be either a text string or another word image, the aim is to retrieve the relevant word images in a dataset (Almazán 2014, Gordo 2015).

In all these cases, the goal has been to retrieve or recognize exactly the same word used as a query, without taking semantics into consideration. For example, given a query image which includes the word phoenix, it would be transcribed as phoenix, without any consideration of its meaning. Similarly, using the text string restaurant as a query would only retrieve images containing this word in them.

There are several applications, however, where it would be advantageous to consider semantics in word image recognition and retrieval. For example, it could be useful to capture the semantic meanings of the word phoenix as both a city and a state capital, and also its semantic meaning as a mythical being. Semantics play a role in scene understanding and for scene text, particularly in urban scenarios. To illustrate this, given a street scene it could be useful to classify building faces into different business classes such as restaurants, hotels, banks, etc. While the presence of a sign pizzeria is indicative of a restaurant, the mere transcription of the text in the sign is not sufficient in itself to deduce this. Additional reasoning capabilities enabled by an understanding of the semantics of the word are required to make the classification decision.

A two-step approach for achieving this objective could include first transcribing the word image to identify a character sequence, and then matching the transcription to a lexical resource which defines a set of semantic concepts. However, this approach has some shortcomings. First, it relies on an accurate transcription of the word images. Although word image recognition has improved significantly in recent years, the results are still not perfect, particularly when word images are not cropped exactly. Second, the approach cannot deal with out-of-vocabulary words. Even if a word is transcribed correctly, if the word does not appear in the lexical resource, it will not be possible to assign concepts to it. Finally, this approach does not lead to a compact representation of word images that encodes semantics.

Therefore, there remains a need for a system and method for recognition and retrieval based on word images that does not suffer from such disadvantages.

INCORPORATION BY REFERENCE

The following references, the disclosures of which are incorporated in their entireties by reference, are mentioned:

U.S. application Ser. No. 14/691,021, filed Apr. 20, 2015, entitled FISHER VECTORS MEET NEURAL NETWORKS: A HYBRID VISUAL CLASSIFICATION ARCHITECTURE, by Florent C. Perronnin, et al.

U.S. application Ser. No. 14/793,434, filed Jul. 7, 2015, entitled EXTRACTING GRADIENT FEATURES FROM NEURAL NETWORKS, by Albert Gordo, et al.

U.S. Pub. No. 20130060786, published Mar. 7, 2013, entitled TEXT-BASED SEARCHING OF IMAGE DATA, by Jose Antonio Rodriguez Serrano, et al.

U.S. Pub. No. 20130290222, published Oct. 31, 2013, entitled RETRIEVAL SYSTEM AND METHOD LEVERAGING CATEGORY-LEVEL LABELS by Albert Gordo, et al.

U.S. Pub. No. 20140219563, published Aug. 7, 2014, entitled LABEL-EMBEDDING FOR TEXT RECOGNITION, by Jose Antonio Rodriguez Serrano, et al.

U.S. Pub No. 20150104073, published Apr. 16, 2015, entitled DELAYED VEHICLE IDENTIFICATION FOR PRIVACY ENFORCEMENT, by Jose Antonio Rodriguez Serrano, et al.

BRIEF DESCRIPTION

In accordance with one aspect of the exemplary embodiment, a semantic comparison method includes providing training word images labeled with concepts. With the training word images and their labels, a first embedding function is learned for embedding word images in a semantic subspace into which the concepts are able to be embedded with a second embedding function. A query, which includes at least one test word image or at least one concept, is received. When the query includes at least one test word image, a representation of each of the at least one test word image is generated. This includes embedding the test word image in the semantic subspace with the first embedding function. Where the query includes at least one concept, a representation of the at least one concept generated by embedding each of the at least one concept with the embedding function is provided. A comparison is computed between one or more of the test word image representations, and/or one or more of the concept representations and information based on the comparison is output.

One or more of the steps of the method may be implemented with a processor.

In accordance with another aspect of the exemplary embodiment, a semantic comparison system includes memory which stores a neural network having parameters which have been trained with training word images labeled with concepts from a set of concepts. Each of the concepts corresponds to a respective set of entity names. Each training word image is an image of one of the set of entity names for the concept with which the respective word image is labeled. The neural network has been trained to embed the training word images and the concepts into a common semantic space with a ranking loss objective function which favors those of the concepts that are relevant to a word image being ranked, by the neural network, ahead of those that are not relevant. A comparison component computes a compatibility between a word image and a concept which have both been embedded in the common semantic space using the trained neural network. An output component outputs information based on the comparison. A processor in communication with the memory implements the comparison component and output component.

In accordance with another aspect of the exemplary embodiment, a semantic comparison method includes providing a neural network having parameters which have been learned on training word images labeled with concepts from a set of concepts, the neural network having been learned to embed the training word images and the concepts into a common semantic space with a ranking loss objective function which favors the concepts that are relevant to a training word image being ranked, by the neural network, ahead of those that are not relevant. A compatibility is computed between a word image and a concept which have both been embedded in the common semantic space using the trained neural network. Information based on the compatibility computation is output.

One or more of the steps of the method may be implemented with a processor.

BRIEF DESCRIPTION OF THE DRAWINGS

FIG. 15 shows qualitative results for the LEWIS method on the image-to-concept task with K=128 and concepts from levels 7 and 8; and FIG. 16 shows qualitative results for the LEWIS method on the concept-to-image task with K=128 and concepts from levels 7 and 8, showing images of unique words returned in the first positions.

DETAILED DESCRIPTION

Aspects of the exemplary embodiment relate to a system and method for embedding word images and semantic concepts in a shared vectorial space by using a model, such as a Convolutional Neural Network (CNN) which has been trained end-to-end for the task, directly from the raw pixels of training word images and their semantic concepts. The method facilitates computing a relevance score between an image containing a word and a semantic concept, using the CNN output.

One advantage of the method is that it avoids an intermediate transcription step. Another advantage is that it can yield significantly better encodings for several retrieval tasks (image-to-concept, concept-to-image, image-to-image). Another advantage is that the compact semantic representation can be used as an input feature for other tasks such as clustering word images that share semantics, or searching among word images using a semantic concept as a query.

In the exemplary embodiment, a convolutional neural network architecture is used to generate a semantic representation of a word image which does not involve transcribing (recognizing) the word image or its characters and which embeds both word images and semantic concepts in a latent common subspace. The method performs comparably to or better, in terms of accuracy, than a well-respected two-step approach that uses word recognition techniques.

Figure 1:
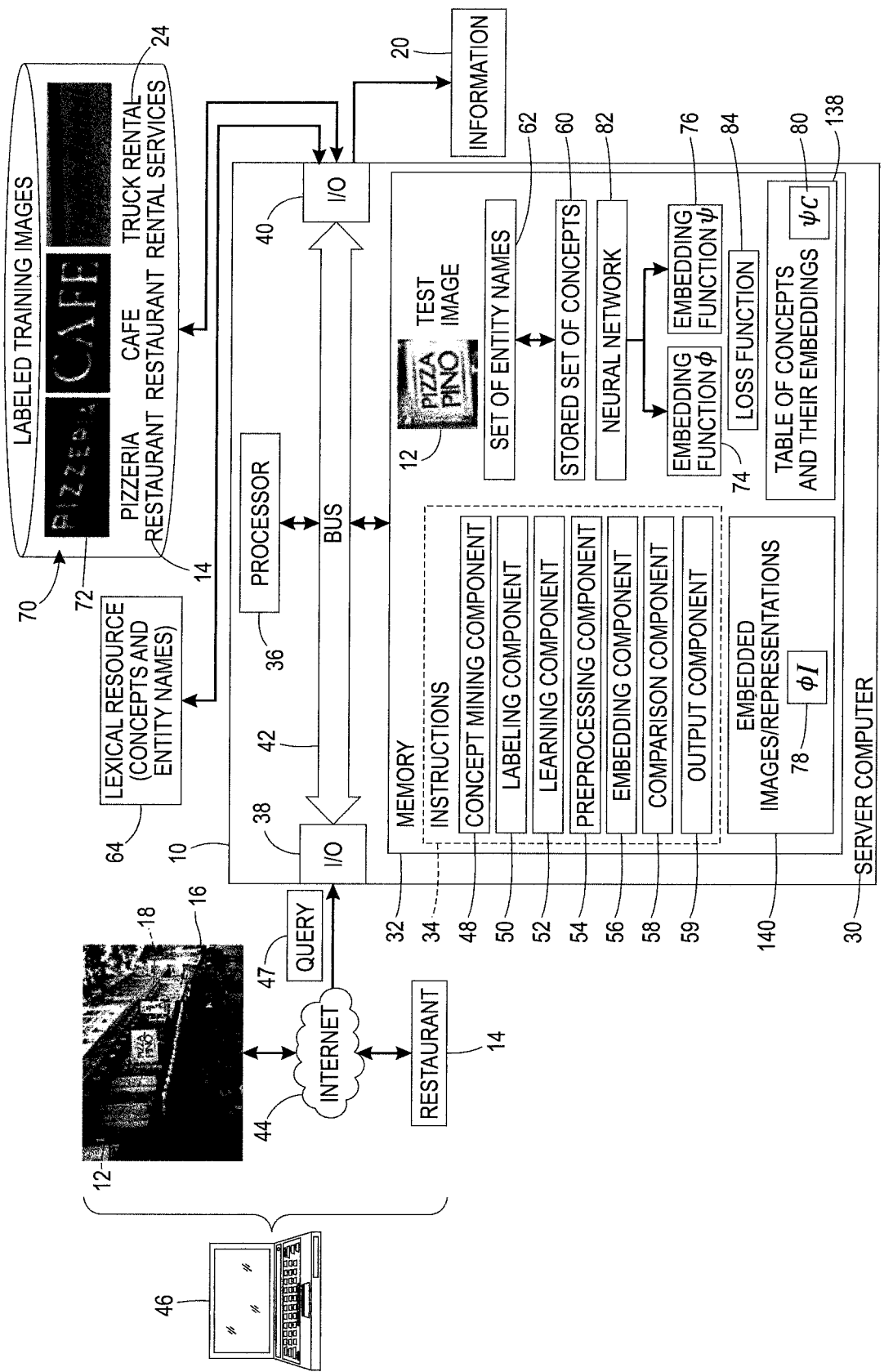
FIG. 1 is a functional block diagram of a semantic system for representing word images and semantic labels of concepts in a common subspace in accordance with one aspect of the exemplary embodiment.

FIG. 1 illustrates a semantic system 10 for representing word images 12 and semantic concept labels 14 in a common subspace and for computing a compatibility between them, which may be used, for example, for retrieval or comparison. A word image 12 is an image in which an arrangement of some of the pixels, in combination, forms a string of characters from a recognizable alphabet, such as Latin, Greek, Cyrillic, Kanji, etc. The number of characters in a word image is not limited and may include, for example, at least one or at least two characters from the alphabet which together form a sequence of one or more words (more generally referred to as an entity name). A training word image is simply a word image used for training purposes, while a test word image is a word image for which a representation is to be generated.

As an illustrative example, consider the case where an input image 16 is received of a street scene and the aim is to classify signs 18 on buildings (cropped to form word images 12), which may be quite variable in their fonts and styles and text content, into concepts, such as restaurants, hotels, banks, clothing retailers, etc. (semantic recognition). In another illustrative embodiment, a semantic label (concept) 14 is received and the aim is to identify word images 12 which are highly ranked for that semantic label 14 (semantic retrieval). The system outputs information 20 according to the type of task being performed. In another illustrative embodiment, a test word image 12 is received as the query and the aim is to identify, from a collection of word images, other word images 12 representing the same semantic concept(s). The system may be configured to perform one or more of these tasks.

Figure 2:
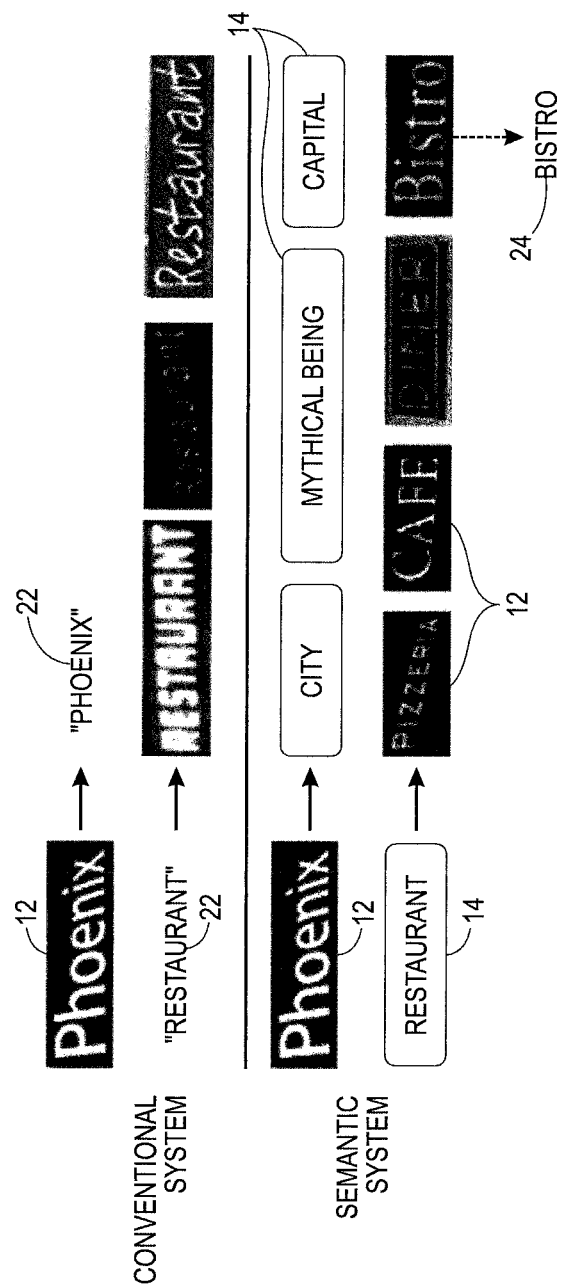
FIG. 2 compares conventional and semantic matching of illustrative word images and concept labels.

FIG. 2 compares the first two of these types of word image understanding tasks with conventional word image recognition and retrieval tasks. Strings in quotes represent text strings while strings in bounding boxes represent concepts 14. Given a test word image 12 of the word Phoenix, the conventional recognition task involves transcription of a text string 22 from the image which should match exactly what a person sees in the word image. In the present system 10 and method, given the same word image 12, semantic recognition entails outputting one or more semantic labels 14 (concepts) that are predicted to be relevant for that word image. In general, none (or a minority) of these identified concept labels exactly matches the character string present in the word image 12.

For training purposes, each concept 14 is associated with a set of entity names 24, although once trained, test word images of entity names outside this set can rank highly for the concept. In general at least some of the concepts 14 include at least two entity names 24 and some of the concepts may include at least three, four, five or more entity names. Given a concept label 14, such as restaurant, the semantic system 10 identifies test word images 12 which are ranked highly for the concept, such as those which contain image pixels corresponding to the entity name 24, e.g., diner, pizza, or bistro. The semantic system 10 thus allows performing tasks beyond simple lexical matching.

Figure 3:
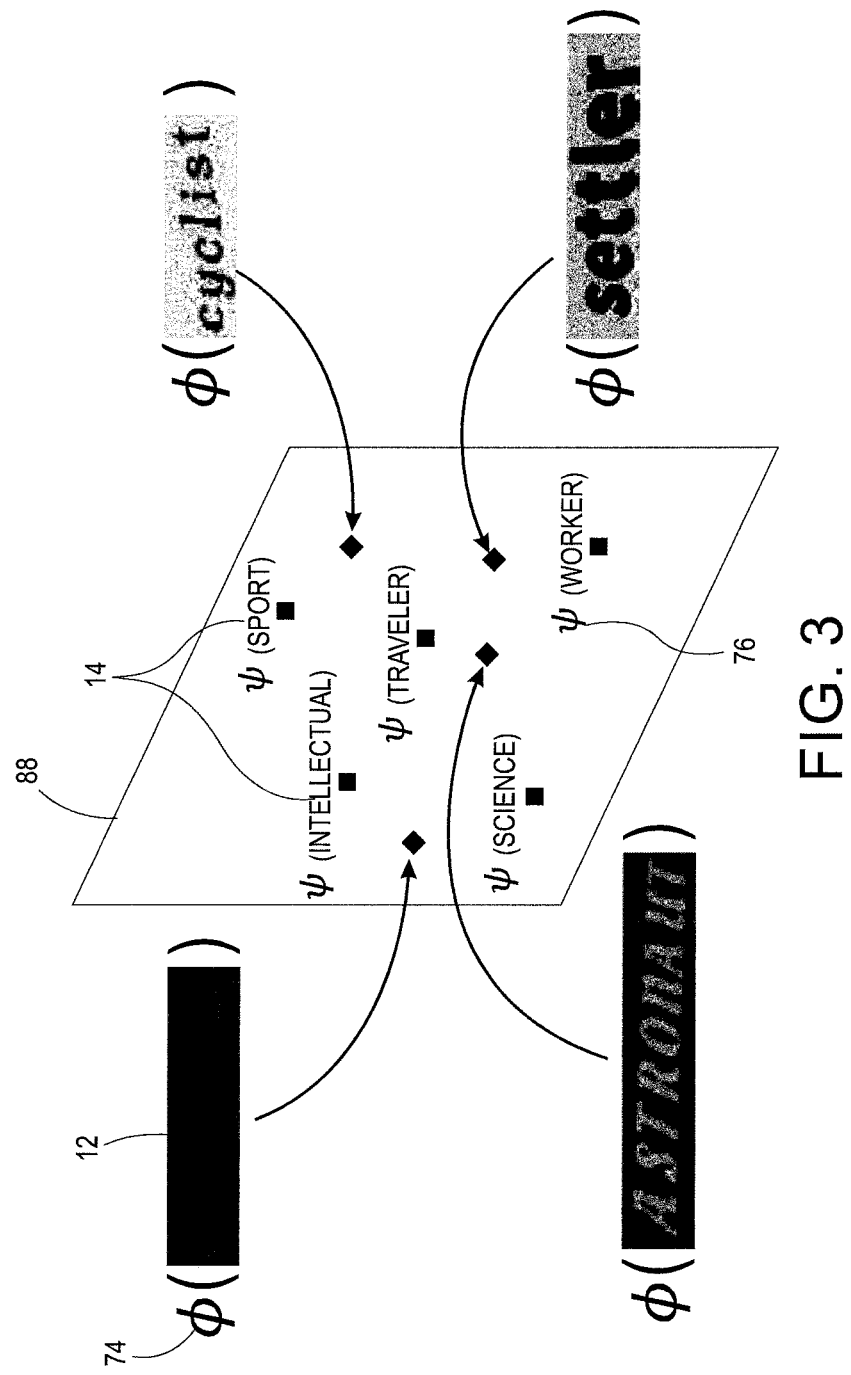
FIG. 3 illustrates an outline of a method for learning embedding functions which embed word images and concepts into a common subspace.

Returning to FIG. 1, the system 10 may include one or more computing devices 30 including memory 32 which stores instructions 34 for performing the method(s) described with reference to FIGS. 3 and/or 4 and a processor 36 in communication with the memory 32 for executing the instructions. One or more input/output devices 38, 40 allow the system to communicate with external devices. Hardware components 32, 36, 38, 40 of the system may communicate via a data/control bus 42. The system may communicate, via wired or wireless links 44, such as the Internet, with a query source 46 such as a client computing device, digital image capture device, or the like which identifies one or more test images 12, 16 and/or one or more concepts 14 to be used as a query 47.

The illustrated instructions 34 include a concept mining component 48, a labeling component 50, a learning component 52, a preprocessing component 54, an embedding component 56, a semantic comparison component 58, and an output component 59.

Briefly, the concept mining component 48 extracts a set of concepts 60 for a set 62 of entity names from a lexical resource 64. Each of the concepts corresponds to a set of entity names. A set 70 of training images 72 is provided each of which has been labeled with a respective entity name 24 (generally only a single entity name) visible in the training image. The set 62 of entity names includes some or all of the entity names 24 used as labels for the training images 72.

The labeling component 50 labels each of the training images 72 with one or more respective concepts 14, drawn from the stored set 60 of concepts, which correspond(s) to the respective entity name label 24. In this way, each training word image 72 is an image of one of the set of entity names 24 belonging to the concept (or concepts) 14 with which it is labeled.

The learning component 52 learns embedding functions 74, 76 for embedding word images 12 and concepts 14 as respective multidimensional representations 78, 80 in a common subspace. The learning is performed using a model 82, such as a neural network, and the set 70 of training images 72 which have been labeled with respective concepts 14 by the labeling component.

The preprocessing component 54 preprocesses input images 16 to extract word images 12, if this has not already been performed, at a selected size (pixel dimensions), e.g., by cropping the image 16. The embedding component 56 embeds word images 12 in the embedding space.

The semantic comparison component 58 performs a retrieval or recognition task, based on the embedded representations 78, 80. The output component 59 outputs information 20 based on the comparison. In one embodiment, the semantic comparison component 58 predicts semantic concepts directly for an input query 47 which includes a word image 12, without explicitly trying to transcribe the word image or its characters at any point during the generation of the representation 78. This is feasible, even though different word images 12 corresponding to the same concept 14 may have widely varying appearances (see the restaurant example in FIG. 2). In another embodiment, the semantic comparison component 58 retrieves word images 12 that are predicted to be relevant to a query 47 for a concept 14.

In an exemplary embodiment, the learning component 52 learns parameters of a convolutional neural network (CNN) 82 with a weighted ranking loss objective function 84 that favors the concepts 14 that are relevant to a query image 12 being ranked ahead of those that are not relevant. CNN are described, for example, in Y. LeCun, et al., "Handwritten digit recognition with a back-propagation network," NIPS, pp. 396-404, 1989. Loss functions for learning the neural network are described, for example, in J. Weston, et al., "Wsabie, Scaling up to large vocabulary image annotation," Int'l Joint Conf. on Artificial Intelligence, pp. 2764-2770, 2011, hereinafter, Weston 2011. The model 82 is learned in an end-to-end manner, from image pixels to semantic concept predictions. The neural network 82 serves as a way to embed word images and concepts in a common, latent subspace 88, as graphically illustrated in FIG. 3.

Specifically, the learning component 52 learns the two embedding functions 74, 76 denoted $\phi: \mathcal{I} \to \mathcal{R}^D$ and $\mathcal{C} \to \mathcal{R}^D$ that embed word images 12, denoted $\mathcal{I}$ and concepts 14, denoted $\mathcal{C}$, respectively, in a common subspace 88 of D dimensions, in which embedded images are more likely to be closer to the embedded concepts to which they are related than to the concepts to which they are not related. The exemplary embedding functions 74, 64 are learned in an end-to-end manner with the convolutional neural network 82 and the computed ranking loss 84. As will be appreciated, while FIG. 3 illustrates a 2 dimensional subspace 88 for ease of illustration, D is much larger, such as at least 500, or at least 1000, or up to 100,000, e.g., about 4000.

The exemplary system and method address some of the problems of a two-step approach. In particular, there is no need for word images to be extracted explicitly by transcription, avoiding some of the problems associated with incorrect transcriptions. Further, the system and method allow retrieval of concepts from word images not seen during training or that do not appear in the resource of semantic concepts 60, akin to a zero-shot learning task. The system and method also allow feature vector representations of the word images to be generated that each encode semantic information rather than only lexical information. This facilitates predicting semantic categories from word images and also performing additional tasks, such as searching word images using a concept as a query, or retrieving word images that share concepts with a query word image, even when the images depict different words.

The computer system 10 may include one or more computing devices 30, such as a desktop, a laptop, tablet computer, or palmtop computer, portable digital assistant (PDA), server computer, cellular telephone, pager, image capture device with an integral computer, combination thereof, or other computing device capable of executing instructions for performing the exemplary method.

The memory 32 may represent any type of non-transitory computer readable medium such as random access memory (RAM), read only memory (ROM), magnetic disk or tape, optical disk, flash memory, or holographic memory. In one embodiment, the memory 32 comprises a combination of random access memory and read only memory. In some embodiments, the processor 36 and memory 12 may be combined in a single chip. Memory 32 stores instructions for performing the exemplary method as well as the processed data 78, 80, etc.

The network interface 38, 40 allows the computer to communicate with other devices via a computer network, such as a local area network (LAN) or wide area network (WAN), or the Internet, and may comprise a modulator/demodulator (MODEM) a router, a cable, and and/or Ethernet port.

The digital processor device 36 can be variously embodied, such as by a single-core processor, a dual-core processor (or more generally by a multiple-core processor), a digital processor and cooperating math coprocessor, a digital controller, or the like. The digital processor 36, in addition to executing instructions 34 may also control the operation of the computer 30.

As will be appreciated, the components may be software instructions implemented by hardware, or may be embodied in separate hardware components. In some embodiments, the training may be performed using a separate computing device and the relevant parameters of the learned neural network output to a computing device used for computing semantic representations of word images. In one embodiment, the concept representations may be stored as a table and need not be accessed from the CNN, once trained.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 1 is a high level functional block diagram of only a portion of the components which are incorporated into a computer system 10. Since the configuration and operation of programmable computers are well known, they will not be described further.

Figure 4:
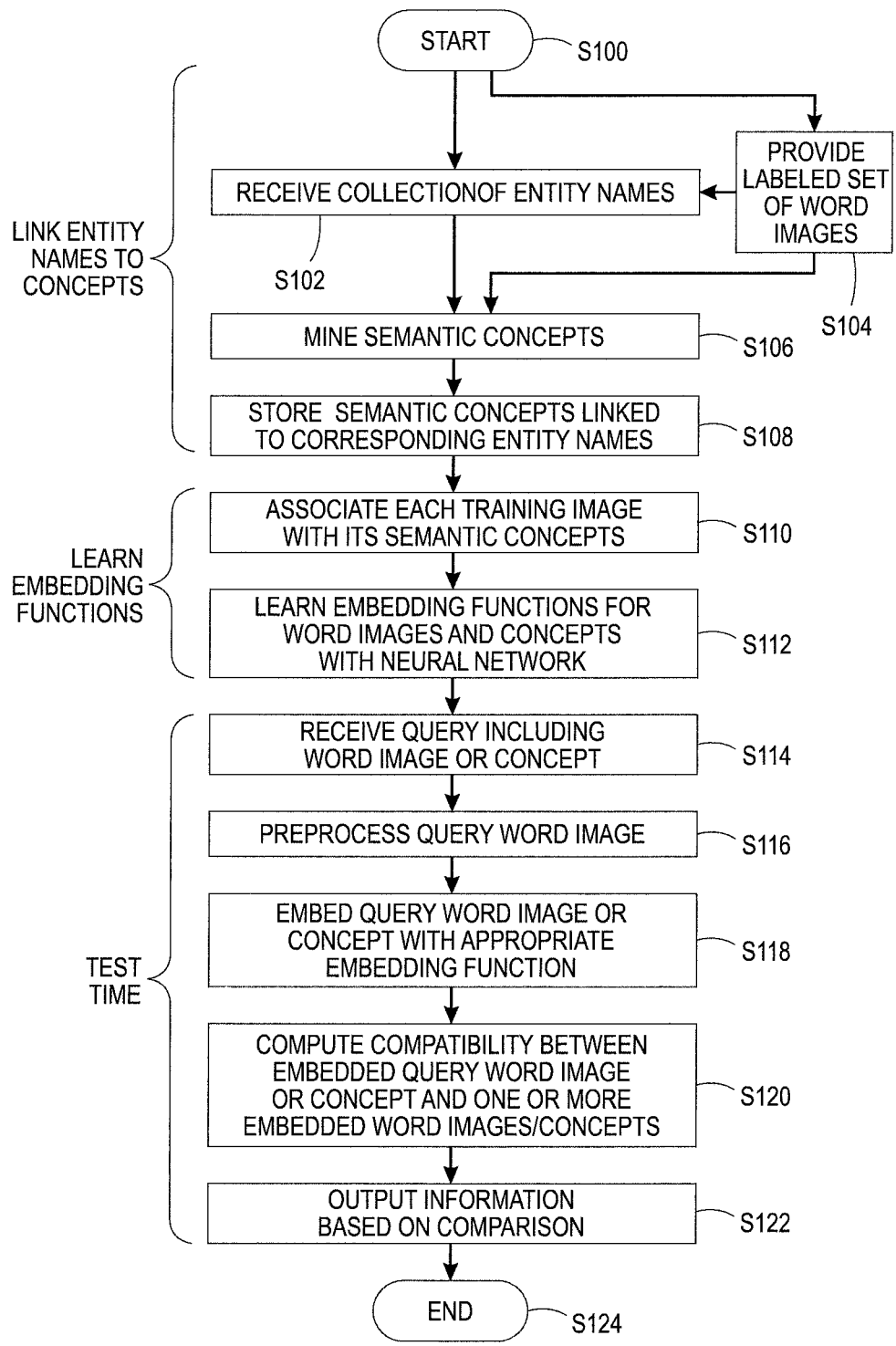
FIG. 4 is a flow chart illustrating a method for training and using the system of FIG. 1 in accordance with another aspect of the exemplary embodiment.

FIG. 4 illustrates a method for embedding concepts 14 and word images 12 in a common Euclidean subspace 88 for various tasks, such as recognition and retrieval, which may be performed with the system of claim 1. The method begins at S100.

At S102, a collection 62 of entity names 24 (words or short phrases of interest) is received, such as those used as labels for a set 70 of training images 72.

At S104, a labeled training set 70 of word images 72 is provided. Each training image 72 in the set 70 is labeled, e.g., manually, with one or more labels 24 corresponding to one of the entity names.

At S106, semantic concepts 14 are mined by the concept mining component 48, using a lexical resource 64, to identify concepts which correspond to the entity names in the collection 62. The semantic concepts 14 may be extracted from a lexical resource 64 such as WordNet®. In some embodiments, this step may be performed at least partly manually. In other embodiments, the mining may be performed automatically. The set of extracted concepts may be filtered to produce a set 60 which may consist of a predefined number K of concepts 14.

At S108, the set 60 of the identified concepts is stored, each concept being linked to at least one of the entity names 24 in the collection 62. Some entity names may be linked to more than one of the stored concepts.

At S110, each training image 72 is associated with one or more of the extracted semantic concepts 60 that are relevant to it, based on its entity name label(s) 24. For example, the stored set 60 of concepts is accessed with the entity name and those concepts that have been associated with the entity name are retrieved, by the labeling component 50. Training images 72 which do not correspond to any of the concepts remaining in the set 60 may be discarded.

At S112, the training images 72 labeled with the semantic concepts 14 are used, by the learning component 52, to learn first and second embedding functions $\phi$ and $\psi$ 74, 76 that embed word images 12 and concepts 14, respectively, in the semantic space 88. This is achieved by imposing a requirement that concepts relevant to an image should be ranked closer, by the model 82, to such image than non-relevant concepts. In specific embodiments, the model used to learn the embeddings is a convolutional neural network 82. The loss 84 used to learn the ranking may be a weighted approximate pairwise ranking loss (WARP). The $\phi$ function 74, for embedding word images 12, may be constructed with the activations of the previous-to-last layer of the trained CNN model 82 and the $\psi$ function, for embedding the concepts may be constructed with the weights of the last layer of the CNN model 82, as described in greater detail below.

The embeddings 80 of the concepts 14 in the set 60 may be stored in memory.

This completes the training phase. At test time the process may be as follows:

At S114, a query 47 including at least one test image 12, 16 and/or concept 14 is received.

At S116, if the query 47 is based on an image 16 which contains additional (non-relevant) objects, the image may be preprocessed by the preprocessing component 54, to form a word image 12, e.g., by cropping the image to an area where an entity name is predicted to be located and optionally changing the pixel dimensions to a fixed size. In the case of a word image 12 as input, the resolution of the word image may be changed to a fixed size (pixel dimensions).

At S118, the query word image 12/concept 14 is embedded, by the embedding component 56, using the respective learned embedding function 74 or 76. In the case of a word image 12 as the query, the optionally preprocessed word image is fed into to the trained CNN model 82 and a forward pass of the network is performed. The activations of a selected layer of the model, after using the image 12 as input, are extracted, which constitute the word image embedding 78. In one embodiment, the activations are extracted from a fully connected layer of the CNN, such as the previous-to-last layer of the trained CNN 82. In another embodiment, the activations of the last layer of the CNN model are extracted as the test word image embedding. In the case of a concept 14 as a query, the D weights for the last layer of the neural network 82 which correspond to that concept may be used (the weights of the last layer form a matrix of dimensionality D×K (e.g., D=4096), where every one of the K columns, of D dimensions each, corresponds to one of the K concepts). As noted above, the embedding of the concept does not need to be computed for each query but may be precomputed and stored at training time.

At S120, a compatibility (e.g., similarity) is computed, by the comparison component 58, between the query word image/concept and one or more stored concepts/word images by computing a similarity between their respective embeddings in the common subspace 88. The similarity may be computed with a suitable similarity measure. For example, in the exemplary embedded space, the similarity between word images and concepts can be measured using a dot product or Euclidean distance between the two vectorial representations.

At S122, information 20 is output based on the comparison performed at S120, which may depend on the task being performed and/or any further processing steps which are performed on the output of step S120. The method ends at S124.

The method illustrated in FIG. 4 may be implemented in a computer program product or products that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 30, (for example, an internal hard drive of RAM), or may be separate (for example, an external hard drive operatively connected with the computer 30), or may be separate and accessed via a digital data network such as a local area network (LAN) or the Internet (for example, as a redundant array of inexpensive of independent disks (RAID) or other network server storage that is indirectly accessed by the computer 30, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 4, can be used to implement the method. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

Further details on the system and method will now be provided.

Word Images

Images 12, 16, 72 may be received by the system 10 in any convenient file format, such as JPEG, GIF, JBIG, BMP, TIFF, or the like or other common file format used for images and which may optionally be converted to another suitable format prior to processing. Input query images may be stored in memory 32 during processing. Images 12, 16, can be input from any suitable image source 46, such as a workstation, database, memory storage device, such as a disk, image capture device, such as a camera, or the like. In general, each input digital image includes image data for an array of pixels forming the image.

The images 12, 16, 72 may be individual images, such as photographs, video frames, synthetic images, or the like. In one embodiment each image 12, 16 (and optionally 72), may be a digital photograph expected to include a region in which characters of a text string are visible as a set of pixels of the image. The image data of the image, which is input to the CNN, may include colorant values for each of the pixels in the image, such as grayscale values, for each of a set of color separations, such as L*a*b* or RGB, or be expressed in another other color space in which different colors can be represented. In general, "grayscale" refers to the optical density value of any single color channel, however expressed (L*a*b*, RGB, YCbCr, etc.). The exemplary embodiment may also be used for black and white (monochrome) images or for images which have been converted to monochrome for convenient processing.

In some embodiments, word images 12 are formed by localizing the text content in the image 16 and cropping the extraneous content out of the image. The query image may be reduced to the same dimensions as the training images, e.g., to a fixed number of pixels in x and y directions, for ease of computation. Methods of cropping images are well known and are widely used, for example in Automated License Plate Recognition (ALPR) techniques. See, for example, U.S. Pub No. 20150104073, published Apr. 16, 2015, entitled DELAYED VEHICLE IDENTIFICATION FOR PRIVACY ENFORCEMENT, by Jose Antonio Rodriguez-Serrano, et al., incorporated herein by reference in its entirety.

In some embodiments, some or all the training word images 72 may be generated synthetically by applying realistic distortions to word images that have been automatically rendered by a computing device, using a set of different font types. The font types may have been specifically or randomly selected from a catalogue of such font types, such as Arial, Courier, Times New Roman, etc. In each font type, each of a predefined alphabet of characters is defined by an arrangement of pixels for a given font size (e.g., 12 pt) and font style (e.g., normal, bold, or italic). The distortions may be used to give the appearance of a word image obtained when captured at an angle or when partially occluded.

Mining Lexical Resource for Semantic Concepts (S106)

Figure 5:
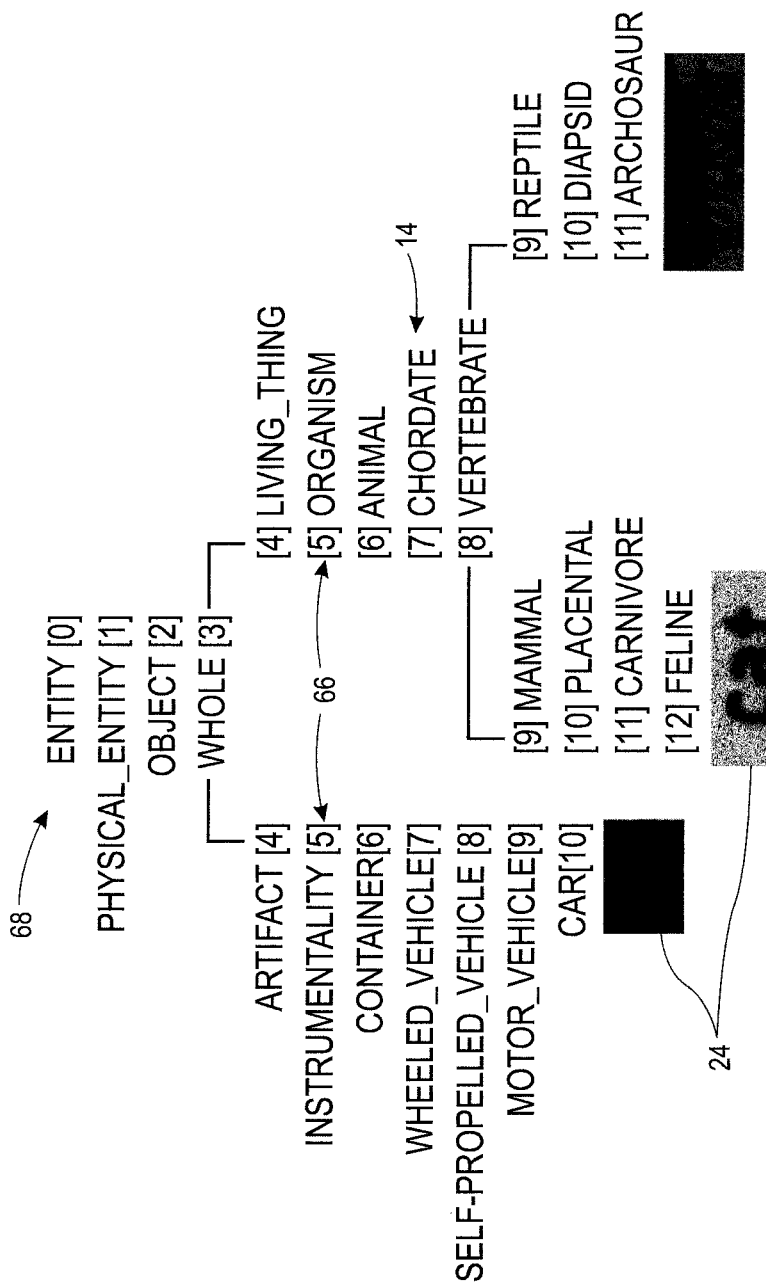
FIG. 5 shows an illustrative section of the WordNet® hierarchy showing three words and their hypernyms up to the root.

In an exemplary embodiment, a lexical resource 64, such as WordNet®, is mined for semantic concepts by identifying hypernyms of each of a set 62 of selected entity names 24, such as the entity names with which the training images 72 are labeled. WordNet (see, WordNet®, Princeton University, 2010, at http://wordnet.princeton.edu) is a lexical database for the English language. Words are organized into groups of synonyms called synsets, and these groups in turn are organized in a hierarchical manner using different semantic relations. One of these types of relations is hypernymy: Y is an hypernym of X if X is a kind of Y. For example, the word glass has several hypernyms, two of which are solid (when glass is a material) and container. Therefore, given a training word, the synset or synsets (if the word has several meanings) to which it belongs are found, and then the hypernym hierarchy is climbed to a higher level to identify a hypernym which serves as a concept 14 for one or more of the entity names 24. As an example, paths 66 in a hypernym hierarchy 68 for the words jeep, cat, and dinosaur are shown in FIG. 5, where the number within brackets indicates the depth level of the hierarchy, starting with the root.

It can be seen that cat and dinosaur would be given the same concept label 14 for depth level 8 and above, but different concept labels otherwise. On the other hand, jeep and dinosaur would not share concepts until reaching depth level 3. It can also be seen that entity names 24 from different levels in the same path, for which one is a hypernym of the other, are labeled with the same concept, since the levels are numbered sequentially from the root down. For example, word images of jeep and car would both be given the concept label motor_vehicle if level 9 is selected as the concept labeling layer.

Such hierarchies 68 can be leveraged to produce semantic annotations of an entity name: given an entity name 24 in the training image dataset 70, the set of synsets to which it belongs may first be identified. Each synset in this set corresponds to a different, fine-grained, semantic meaning of the word. Then, for each synset in the set, the hypernym hierarchy 68 is ascended producing increasingly generic concepts with which the word can be annotated, up to the root. Annotating words with all of their hypernyms could produce tens of thousands of concepts, some of them very fine grained (e.g., goblet, in the case of glass), while some others are extremely generic (e.g., entity). In an exemplary embodiment, rather than collecting all the hypernyms of a given word, only the concepts at a given depth level or levels are collected, thereby controlling the granularity of the concepts. As an example, one or more of levels 6-12 in the WordNet hierarchy may be selected. For example, when choosing level 9, cat would be labeled as mammal and dinosaur as reptile, while at level 8 both would be labeled as vertebrate. An evaluation and comparison of the results for different choices of the depth level(s) for selecting concept labels can be performed to determine which level or levels provide the best performance for the selected task.

As will be appreciated, semantic concepts 14 need not be extracted from WordNet as other sources of semantic annotations can be exploited for the method.

Associate Training Images with Semantic Concepts (S110)

This annotation approach described above may still produce several thousand different concepts 14 (classes), some of which are very highly populated with their hypernyms while others may contain as few as one single word. In some embodiments, when the concepts 14 for the set 62 of words 24 have been identified, the system only annotates the training word images 72 with the K most populated concepts. The effect of changing the value of K can be evaluated to identify a suitable value for the selected task. As an example, K may be at least 5, or at least 20, or at least 50, or at least 100, or at least 500 or at least 1000, and in some embodiments, may be up to 5000, or 10,000, or more.

Learning Embedding Functions (S112)

Figure 6:
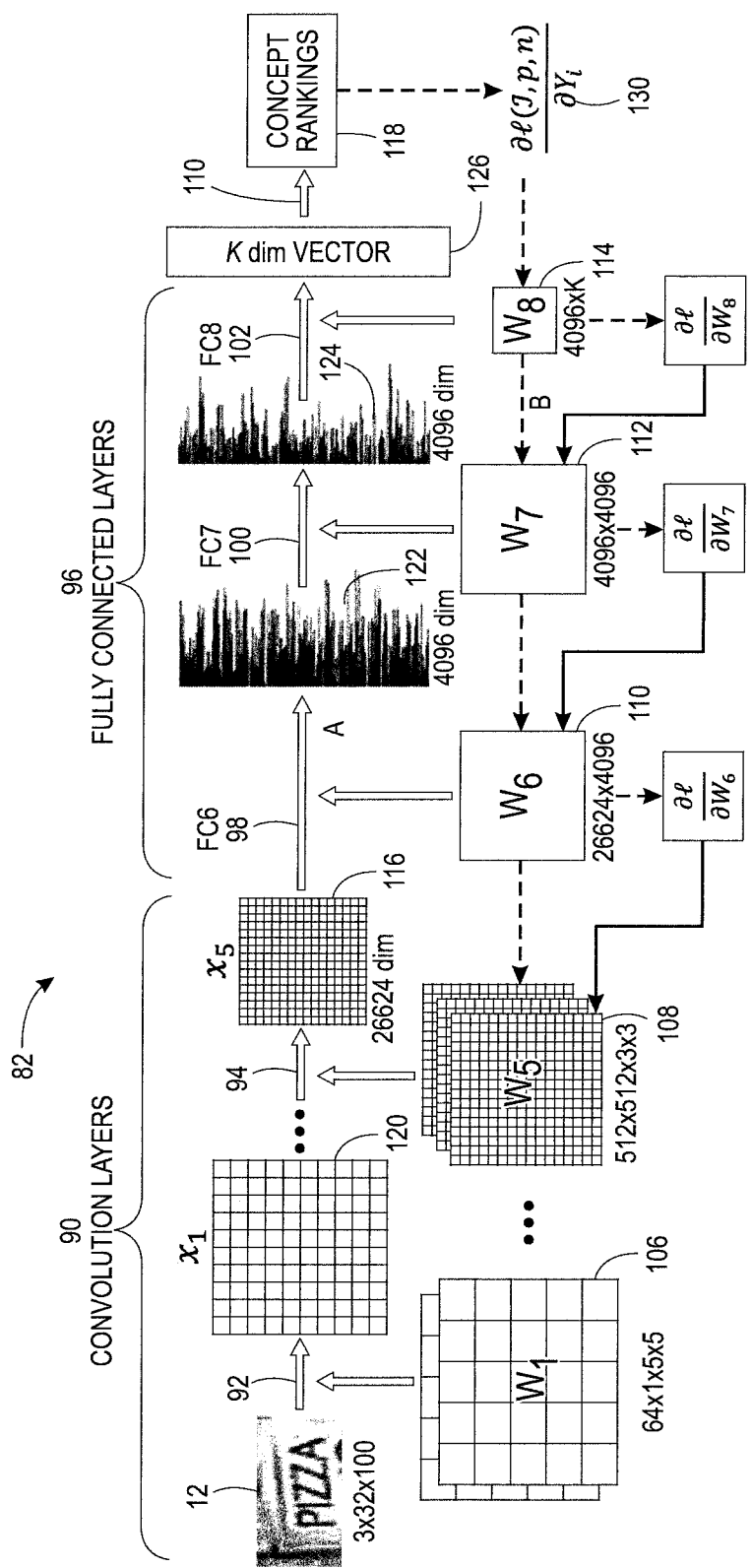
FIG. 6 illustrates an exemplary neural network which can be trained to embed word images and concepts in a common subspace.
Figure 7:
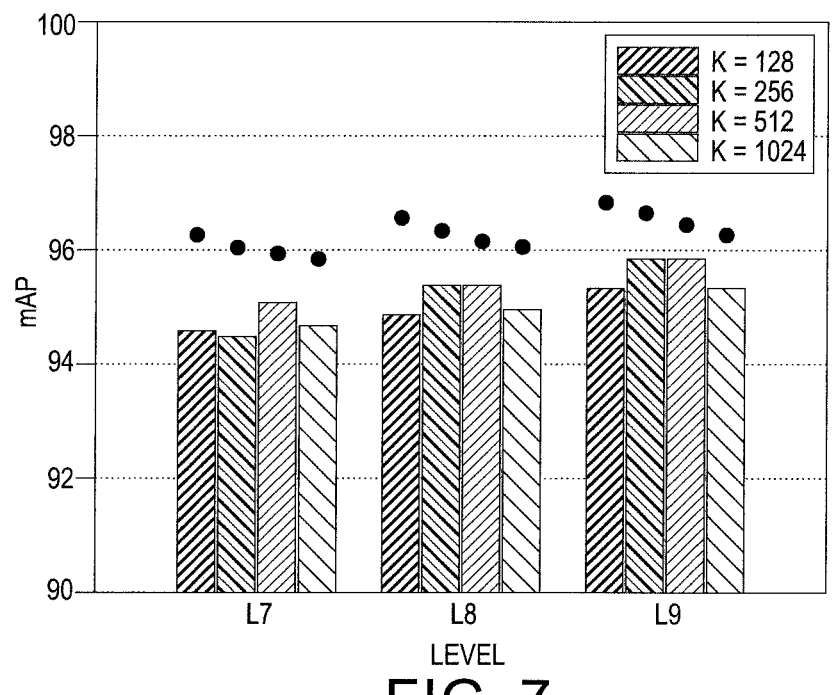
FIGS. 7-10 illustrate quantitative results on the Oxford Synthetic database of word images for different values of K (number of concepts) and l (level of hierarchy from which hypernyms are drawn as concepts). The bars represent the accuracy of the exemplary semantic method (LEWIS), while the dots represent the accuracy of a two-step baseline. Mean Average Precision is shown in FIG. 7 for image-to-concept and in FIG. 8 for concept-to-image results on word images which were accurately cropped and in FIGS. 9 and 10 for image-to-concept and concept-to-image, respectively, on random crops of the word images.
Figure 8:
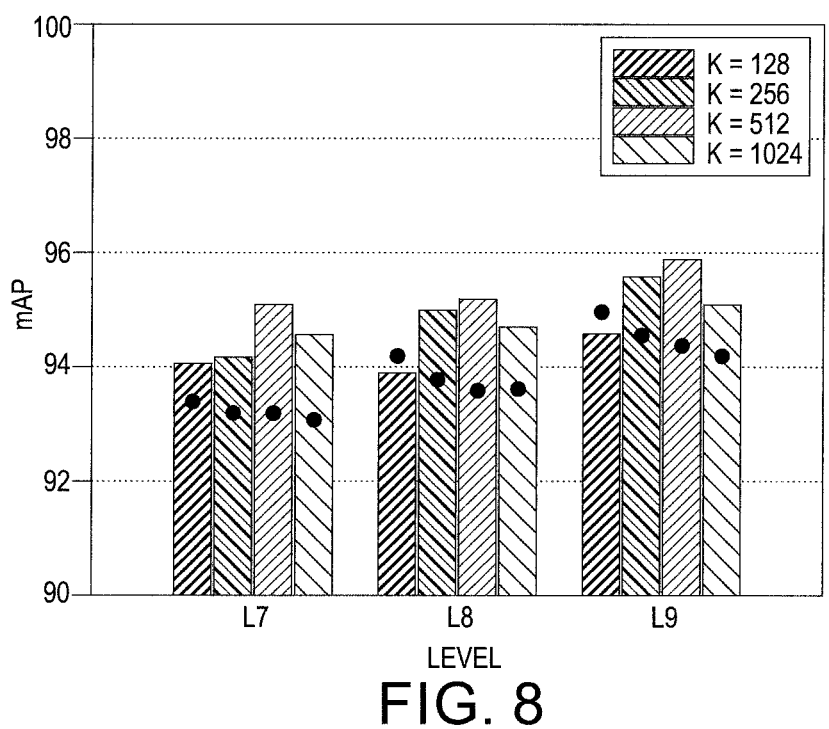
Figure 9:
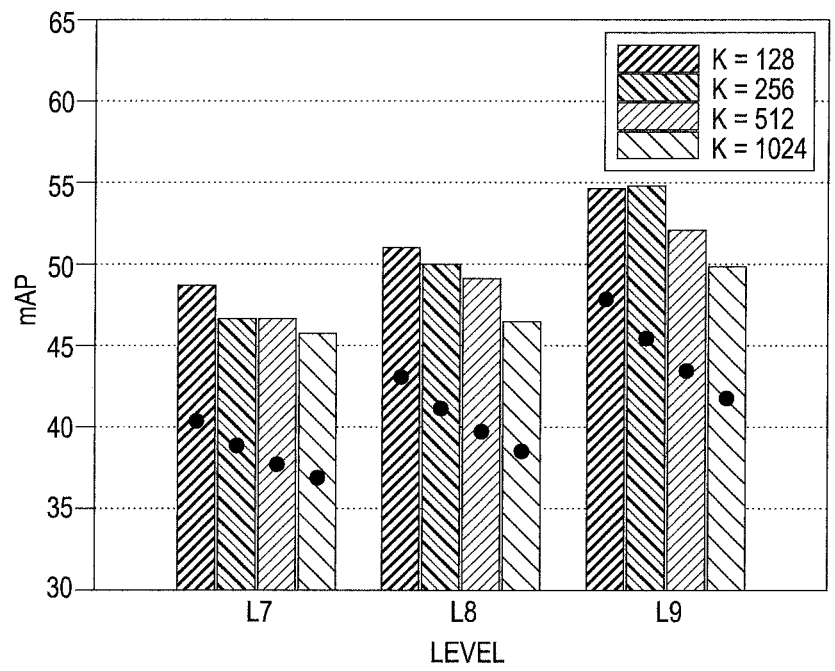
Figure 10:
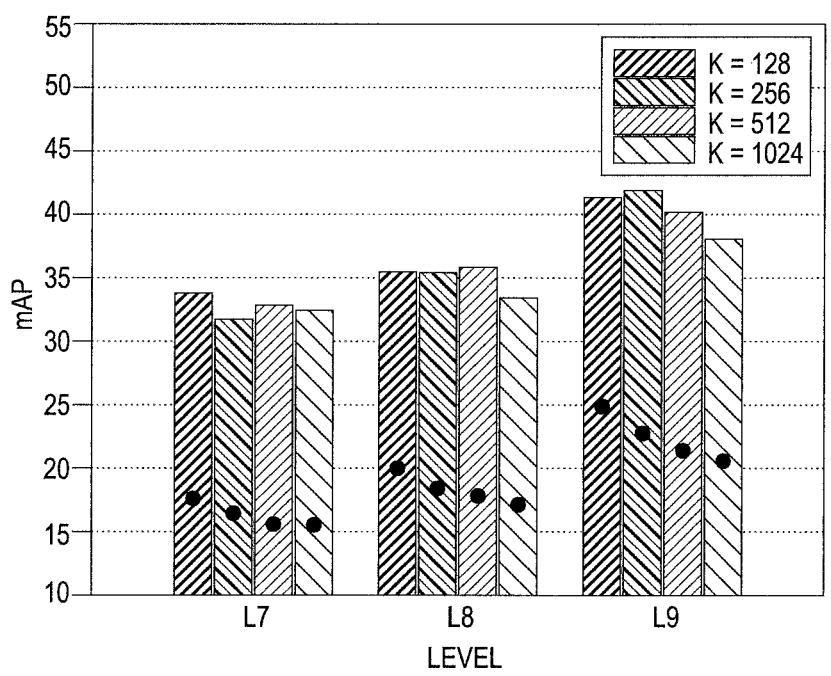

With reference to FIG. 6, a neural network 82 is shown by way of example which can be used for training the embedding functions 74, 76. The illustrative neural network 82 is in general accordance with the architecture of Jaderberg, et al., "Synthetic Data and Artificial Neural Networks for Natural Scene Text Recognition," CoRR, abs/1406.2227, 2014, hereinafter, Jaderberg 2014, which can be adapted for use in the present system and method. The neural network 82 receives as input an image 12, 72, which in the case of color images is a 3D tensor-having for each pixel, three colorant values (R, G, and B in the illustrated embodiment). In the case of monochrome (black and white images), the image is a 2D tensor. The supervised layers (operations) of the NN include a sequence 90 of at least two convolutional layers 92, 94, etc. and a sequence 96 of at least two fully-connected layers 98, 100, 102. In the case of the CNN of Jaderberg, there are five convolutional layers (only two of which are illustrated in FIG. 6), followed by three fully-connected layers, although different numbers of these layers may be employed. In the exemplary CNN used herein, the output dimensionality of the last fully connected layer 102 is the number of semantic concepts K.

Each convolutional layer 92, 94, etc. is parametrized by a tensor 106, 108, etc., having one more dimension than the image, i.e., a 4D tensor in the case of 3D images. Each tensor 106, 108, is a stack of 3D filters, where $W_k$, k=1, . . . , 5 represent the parameters of the 4D tensors 106, 108, etc. of the illustrated convolutional layers.

Each fully-connected layer 98, 100, 102, etc. is parametrized by a weight matrix 110, 112, 114, etc. denoted $W_k$, where k=6, 7, 8, which are the parameters of the fully-connected layers. The stack of fully-connected layers transforms the output activation maps 116 of the last convolutional layer 108 into scores which are converted to concept rankings 118.

During a forward pass of the NN 82 (in direction A indicated by the bold arrows), the filters 106, 108 are run in a sliding window fashion across the output of the previous layer (or the image itself for the first layer 92) in order to produce a 3D tensor 120, 116, etc., which is a stack of per-filter activation maps. These activation maps may then pass through a non-linear transform (such as a Rectified Linear Unit, or ReLU) and an optional max pooling stage (a sliding window is passed across each activation map and the pixels in the window are assigned the highest of their values) before being fed to the next convolutional layer. The ReLU may assign a value of 0 to all negative values in the maps. The activation maps 116 generated by the last convolutional layer 94 in the sequence are flattened, i.e., converted to a 1D tensor (a vector), before being input to the first of the fully connected layers. Each fully-connected layer performs a simple matrix vector multiplication followed by a non-linear transform, e.g., ReLU.

At each fully-connected layer of the sequence 96, the input vector 116, 122, 124 is converted to an output vector 122, 124, 126, respectively, with sequentially fewer dimensions. The output 126 of the final fully-connected layer 102 is used to generate the set of concept rankings 118. A fully-connected layer performs the operation $x_k = \sigma(W_k^T x_{k-1})$, where $W_k^T$ is the transpose of the respective weight matrix, $x_{k-1}$ is the input vector, and $\sigma$ is the non-linear function (e.g., ReLU).

For example, in the NN 82 illustrated in FIG. 6, the word image 12, 72 may be a 3D tensor of size 32×100×3 (i.e., about 3,200 pixels in each of the 3 colors). In the first convolutional layer, the tensor 106 may include 64 filters of 1×5×5 pixels (the image is converted to grayscale), which is used as a sliding window to extract and filter at least 100 or at least 1000 overlapping windows from the image. The result of these filters on the input image is a 3D tensor 120 which includes 64 activation maps. As the sequence progresses, the number of "colors" (activation maps) in the output increases and the number of pixels for each color decreases. The output of the last convolutional layer 94, after max pooling, is a 512×6×6 tensor that is easily converted to a multidimensional vector (26624 dimensions) by concatenation. When multiplied by the matrix 110 of weights, the output is a 4096 dimensional vector 122.

The matrix of weights $W_8$ 114 of the last layer of the neural network 82 can be employed as a transductive embedding of the semantic concepts 14. For example, each column includes a set of weights which can be used as the respective concept embedding (optionally after normalization). To add new concepts, the neural network can be retrained or fine-tuned. The activations 124 of the previous-to-last layer 100 of the neural network can be used as an inductive embedding of the input word images 12. Word images containing words that have not been observed during training can still be embedded in this space and matched with known concepts. The system and method can thus provide Latent Embeddings for Word Images and their Semantics (LEWIS).

Training the NN 82 includes end-to-end learning of the vast number of parameters θ of the weight matrices 110, 112, 114, and stacks of filters 108, 106 via the minimization of the loss function on the large training set 70 of N images and their ground-truth concept label or labels. A particularity of neural networks is that the gradients with respect to all parameters θ can be computed efficiently in a stage-wise fashion via sequential application of the chain rule, a technique termed "back-propagation." See, D. E. Rumelhart, et al., "Learning representations by back-propagating errors," Nature 323, pp. 533-536, 1986. The training of the network (i.e., obtaining the optimum parameters θ*) can be performed via SGD with back-propagation on a large labeled dataset of training images, as described above, which may contain thousands or tens of thousands of labeled word images.

As will be appreciated, other CNN architectures may be employed, such as the AlexNet architecture of A. Krizhevsky, et al., "Imagenet classification with deep convolutional neural networks," NIPS, pp. 1097-105, 2012, hereinafter, Krizhevsky 2012, or that of K. Simonyan, et al., "Very Deep Convolutional Networks for Large-Scale Image Recognition," arxiv 1409.1556, 2014, a pre-trained version of which is available from www.robots.ox.ac.uk/~vgg/research/very_deep/. See, also, LeCun, et al., "Handwritten Digit Recognition with a Back-propagation Network," Adv. in Neural Information Processing Systems, 1990.

Existing CNNs, such as those of Krizhevsky 2012 and Jaderberg 2014 address a mono-label classification problem. The exemplary Neural Network addresses multi-labeling since multiple concepts can be assigned to a given word image. Hence, the standard classification objective which involves computing the cross-entropy between the network output and the ground truth label is replaced with a ranking framework during training, as follows.

In the following, the terms "optimization," "minimization," and similar phraseology are to be broadly construed as one of ordinary skill in the art would understand these terms. For example, these terms are not to be construed as being limited to the absolute global optimum value, absolute global minimum, and so forth. For example, minimization of a function may employ an iterative minimization algorithm that terminates at a stopping criterion before an absolute minimum is reached. It is also contemplated for the optimum or minimum value to be a local optimum or local minimum value.

Assume a set of N training images $\{\mathcal{I}_1, \mathcal{I}_2, \ldots, \mathcal{I}_N\}$ and a set of K semantic concepts $\{\mathcal{C}_1, \mathcal{C}_2, \ldots, \mathcal{C}_K\}$ produced as described for S106. For training purposes, each training image is annotated with at least one of the K semantic concepts. As the transcriptions of the word images are available at training time, this can be achieved by propagating to each image the concepts that are relevant to its transcription, as described above. Let $r(\mathcal{I})$ denote the set of concept indexes that are relevant to image $\mathcal{I}$ and let $\bar{r}(\mathcal{I})$ denote its complementary.

Given this annotation, a compatibility function F is learned between images and concepts such that the number of non-relevant concepts that are ranked ahead of relevant concepts is minimized.

Given an image $\mathcal{I}$, the last fully-connected layer 102 of the CNN architecture produces a prediction vector 126 $Y \in \mathcal{R}^K$, where $Y_i$ represents the predicted compatibility between the image and concept $\mathcal{C}_i$, i.e., $Y_i = F(\mathcal{I}, \mathcal{C}_i)$. $\mathcal{R}$ is the set of real numbers from which the concept indices can be drawn. A ranking objective seeks to minimize the sum, over all training images, of the sum, over all pairs of relevant and non-relevant indices for each training image, of an indicator function, which is a condition of an incompatibility function $F(\mathcal{I}, \mathcal{C}_n)$ and a compatibility function $F(\mathcal{I}, \mathcal{C}_p)$:

$$\min_F \Sigma_{\mathcal{I}} \Sigma_{p \in r(\mathcal{I}), n \in \bar{r}(\mathcal{I})} I_{[F(\mathcal{I}, \mathcal{C}_n) > F(\mathcal{I}, \mathcal{C}_p)]}, \quad (1)$$

where $I_{[cond]}$ is the indicator function that equals 1 when cond is true and to 0 otherwise. $p \in r(\mathcal{I})$ is the index of one of the set r of relevant concepts for the image and $n \in \bar{r}(\mathcal{I})$ is the index of one of the set of non-relevant concepts for the image. Thus, if the incompatibility function gives a value which is greater than the compatibility function, the indicator function outputs a value of 1, which promotes a higher value of Eqn 1, i.e., penalizes the loss. As will be appreciated, Eqn. 1 could be replaced by a maximization function with the greater than symbol > replaced by less than, <. In the present case, no two concepts will receive the same rank, so it is not necessary to assign an indicator function to the case where the two functions $F(\mathcal{I}, \mathcal{C}_n)$ and $F(\mathcal{I}, \mathcal{C}_p)$ are equal, although this is not excluded.

Optimizing Equation (1) directly is generally not feasible due to the indicator function. A differentiable approximation can be used. In particular, the weighted approximately ranked pairwise loss (WARP) as described in Weston 2011 may be used. This ranking loss places more emphasis on the top of the ranked list, leading to superior results under many ranking metrics.

Given two concepts $p \in r(\mathcal{I})$ and $n \in \bar{r}(\mathcal{I})$, their WARP loss is computed as $$l(\mathcal{I}, p, n) = L(\text{rank}(p)) \cdot \max(0, 1 - Y_p + Y_n). \quad (2)$$

Here, rank(p) denotes the ranked position of p, i.e., how many concepts obtained a better score than $\mathcal{C}_p$, while L(rank(p)) is a function of rank(p), which may be of the form:

$$L(\text{rank}(p)) = \Sigma_{j=1}^{\text{rank}(p)} \alpha_j, \text{ with } \alpha_1 \geq \alpha_2 \geq \ldots \geq 0, \quad (3)$$

where different choices of the $\alpha_1$ coefficients lead to the optimization of different measures. For example, where $\alpha_j = 1/j$, this puts higher emphasis on the first results, leading to superior top K accuracy and mean average precision. As an example, if there are 3 concepts above p then L(rank(p)) =$\alpha_1+\alpha_2+\alpha_3$.

Computing the loss over all possible pairs of p and n may be prohibitively expensive. Instead, given an image and a positive category (or concept in this case), negative categories may be sampled until finding one which produces a positive loss, and then that is used for the update of the parameters of the CNN. Similarly, computing the exact rank of p may be expensive if K is not small. In that case, the rank of p can be estimated as $$\frac{K-1}{s},$$

where s is the number of samples that were needed to find a negative category with a positive loss. Although this is a rough approximation, particularly for items with multiple positive labels, it works well in practice.

The subgradient of the loss (error) 130 (FIG. 6), which is used for the backpropagation stage of the training, is given by:

$$\frac{\partial \ell(\mathcal{J}, p, n)}{\partial Y_i} = \begin{cases} -L(\text{rank}(p)) & i = p \text{ and } \ell(\mathcal{J}, p, n) > 0, \\ L(\text{rank}(p)) & i = n \text{ and } \ell(\mathcal{J}, p, n) > 0, \\ 0 & \text{otherwise.} \end{cases} \quad (4)$$

The error 130 is back-propagated to each of the weight matrices $W_8$-$W_6$ and filters $W_5$-$W_1$ in the direction of arrow B to update the respective parameters.

Matrix $W_8$ (and other matrices in the neural network) may be initialized with weights randomly drawn from a Gaussian distribution of mean 0 and a standard deviation of, for example, 0.01. Other forms of initialization are contemplated. For example, the Xavier initialization described in X. Glorot et al, "Understanding the difficulty of training deep feedforward neural networks, AISTATS 2010, may be used.

While the exemplary embodiment uses the WARP loss, any other ranking loss and optimization procedure which learns to rank with triplets can be used. As an example, the OASIS loss function described in Chechik, et al., "Large Scale Online Learning of Image Similarity through Ranking," J. Machine Learning Research, 11, pp. 1109-1135 (2010), may be used.

Latent Embeddings (S118)

The output activations of a selected layer of the network can be used to produce a task-specific "attributes" representation that encodes the scores that the image obtains for each of the classes used during learning. Chatfield, et al., "Return of the devil in the details: Delving deep into convolutional nets," British Machine Vision Conference, 2014; and A. Babenko, et al., "Neural codes for image retrieval," ECCV, LNCS 8689, pp. 584-599, 2014, describes extraction of features from neural networks, but in a different manner.

Extracting features from the earlier layers of the neural network tends to produce more generic features, which tend to be less useful than the features of the later layers. In an exemplary embodiment, a semantic representation 78 of each word image is (or is based on) a vector of the activations 124 of the penultimate layer 100 (FC7, 4,096 dimensions) of the trained neural network. To obtain the semantic representation 78 therefore, the word image 12 passes through the convolutional and fully connected layers 92, 94, 98, etc., in turn, up to the penultimate fully-connected layer 100 (or other selected fully-connected layer), with the output of each preceding layer being passed to the next layer. The activations output by the selected layer 100 may then be used as the embedding of the word image, optionally after normalization, such as $l_1$ or $l_2$ normalization.

The weights $W_8$ 114 of the last layer 102 of the architecture can be used as embeddings 80 of the semantic concepts 60, or the representation may be based thereon.

Compatibility Computation (S120)

At S120, the semantic comparison component 58 performs a comparison between embedded word image(s) 78 and/or embedded concept(s) 80, e.g., for recognition or retrieval purposes.

Because of the way the network 82 is constructed, the dot product between the word image embeddings 78 and the concept embeddings 80 provides a suitable compatibility function F($\mathcal{J}$, $\mathcal{C}_K$) between word images and concepts. Let $\phi\mathcal{J}$ denote the activations 124 of the FC7 layer 100 of the network given image $\mathcal{J}$, and let $\psi_k$ denote the k-th column of the weight matrix 114 of the last layer, then F($\mathcal{J}$, $\mathcal{C}_K$)=$\phi(\mathcal{J})^T\psi_k$.

$\psi_k$ can be understood as a transductive embedding of concept $\mathcal{C}_K$, i.e., a function $\psi$ can be defined which acts as a simple look-up table 138 such that $\psi(\mathcal{C}_K)=\psi_k$. This facilitates tasks which may be performed, such as querying the image dataset using a concept as a query, or performing an image-to-image search, as illustrated in FIG. 3.

In one embodiment, the comparison is used for finding the most related concepts to a query word image, e.g., by obtaining the image embedding 78 and computing F($\mathcal{J}$, $\mathcal{C}_K$)=$\phi(\mathcal{J})^T\psi_k$ for each of the set of concepts. A data structure 138, such as a table, may store the K concepts 14 (or their indices) and the corresponding embedding 80 of each concept k (FIG. 1).

In another embodiment, the comparison is used for finding the most related images to a query concept (or a combination of query concepts), e.g., by retrieving the embedding of the concept from the weight matrix 114, obtaining the image embedding for each of a set of images, and computing F($\mathcal{J}$, $\mathcal{C}_K$)=$\phi(\mathcal{J})^T\psi_k$ for each of the set of image embeddings. In one embodiment, a set of images to be used for comparison may have been previously embedded using the CNN. Their embeddings 76 (or representations generated therefrom) may be stored in a data structure 140, such as a table, in memory 32 (FIG. 1) together with an index of the respective word image, allowing the word image to be retrieved from an indexed database stored in memory, such as local or remote memory.

In another embodiment, the comparison is used for finding the most related images to a query image, where images are related if they have concepts in common. In that case, the compatibility function can be expressed as F($\mathcal{J}_1$, $\mathcal{J}_2$)=$\phi(\mathcal{J}_1)^T\phi(\mathcal{J}_2)$. The embedded features $\phi(\mathcal{J}_1)$ and $\phi(\mathcal{J}_2)$ for first and second images $\mathcal{J}_1$ and $\mathcal{J}_2$ may be extracted from the previous-to-last layer (FC7, 4,096 dimensions) or the last layer (FC8, K dimensions). The features may be $l_2$-normalized and compared using the dot product.

These sort of tasks can thus be readily performed by a nearest neighbors search in the embedded space.

In another embodiment, the comparison is used to determine whether the query word image 12 matches a preselected concept, for example, to answer a question such as "does this image include a word image (cropped region of the image) that corresponds to the concept restaurant?" In another embodiment, the comparison is used to determine whether a query concept matches a preselected word image, for example, to answer a question such as "is restaurant the correct concept for the selected word image?" These latter two tasks can be performed by determining whether the computed similarity between the word image and concept in the embedding space meets a predetermined threshold on similarity.

Applications of the System and Method

The method finds application in a variety of tasks where fine-grained image understanding is useful. As examples, the method may be used in transportation (e.g., surveillance, car park monitoring, etc.), retail (shelf-level reasoning, surveillance, etc.), customer care (analysis of the environment). Intelligent Transportation Systems (ITS), in particular, operate in urban environments where text in the form of signage (on roadways, businesses, vehicles, etc.) is ubiquitous. Using text semantics to gain a finer-grained understanding of urban scenes allows ITS services to be more useful.

Without intending to limit the scope of the exemplary embodiment, the following Examples illustrate the applicability of the method on publically available datasets.

EXAMPLES

The following publicly-available datasets were used:

1: Oxford Synthetic Word (OSW) dataset (see Jaderberg 2014). This is a large dataset containing 9 million annotated word images covering a dictionary of approximately 90,000 English words. The dataset has been synthetically generated by applying realistic distortions to rendered word images using randomly selected fonts from a catalogue of 1400 fonts downloaded from Google Fonts. The official train, validation, and test partitions contain approximately 7.2 million, 800,000 and 820,000 images, respectively. Despite being a synthetic dataset, models learned with it have been found to give good results on real data (Jaderberg 2014).

The CNN models learned on the OSW dataset were also used for evaluation of the method on the following datasets:

2: Street View Text (SVT) dataset (Wang 2011). This contains a total of 904 cropped word images harvested from Google Street View.

3: IIIT 5k-word (IIIT5K) dataset (Mishra, et al., "Scene text recognition using higher order language priors," BMVC 2012), which contains 5000 cropped word images from natural and born-digital images.

In both cases, only the official test partitions (647 word images in SVT and 3000 in IIIT5K) were used.

Mining Semantic Concepts

To extract the semantic annotations of each word, the hypernym path to the root for every meaning of the word is found, as described above and illustrated in FIG. 5. With the root labeled as level 0, each level below the root can is labeled with a higher number than its parent level. Only the concepts at level l of each path are kept.

Experiments were performed to evaluate the effect of varying the level l at which concepts are selected from 7 to 9. This approach was used to extract concepts from the 90,000 words in the Oxford Synthetic dataset. Concepts are then sorted according to how many different words were assigned to them, and only the top K most populated concepts are kept. In various experiments, the value of K is varied from 128 to 1024. Any word that was not found in the WordNet database or that is not assigned to any concept in the top K is ignored, both at training and at test time. In the most fine-grained case (l=9, K=128) this results in 9900 unique words, and about 820,000 training images and 100,000 testing images. On the other extreme (l=7, K=1,024) the dataset contains 34,153 unique words, 3 million training images, and 350,000 testing images. The mean number of concepts assigned to every image ranges from 1.2 to 1.7, depending on the setup, and the maximum number of concepts assigned to a word is 13.

Neural Network

The CNN architecture 82 replicates the one in Jaderberg 2014, except for the size of the last layer (90,000 in the case of Jaderberg vs K in the present case) and the loss (cross-entropy in their case, and a WARP ranking loss in the present case). In particular, 5 convolutional layers are used, with 64, 128, 256, 512, and 512 kernels, respectively, of sizes 5×5, 5×5, 3×3, 3×3, and 3×3, and a stride of 1 pixel for the sliding window (the images are converted to grayscale). A max pooling with size 2 and a stride of 2 pixels is applied after layers 1, 2, and 4. The convolutional layers are followed by three fully-connected layers (FC6, FC7, and FC8) of sizes 4,096, 4,096, and K, respectively. A ReLU non-linearity is applied after every convolutional layer and each fully connected layer. Dropout regularization is applied right after layers FC6 and FC7 with a drop rate of 0.5. Input images 12, 72 are resized to 32×100 pixels without preserving the aspect ratio, as in Jaderberg 2014.

Learning was done using a modified version of Caffe (Jia, et al., "Gaffe: Convolutional Architecture for Fast Feature Embedding," arXiv preprint arXiv:1408.5093, 2014. For efficiency reasons, three independent models were first learned for l=7, l=8, and l=9, fixing the size of K to 128, and then those models were fine-tuned to larger values of K. Learning all the models 82 took approximately 3 weeks using 2 Tesla K40 NVIDIA GPUs.

Evaluation Protocol

The exemplary LEWIS method was evaluated on three different tasks:

1. Image-to-concept retrieval: the goal is to annotate a query image with one or multiple concepts. This is the task for which the CNN is optimized. Each image in the test set of the datasets is used as a query to retrieve the K concepts ordered by similarity. The similarity between the word image embedding and the concept embeddings is measured as the dot product. Results are reported as mean average precision (MAP).

2. Concept-to-image retrieval: the goal is to retrieve images given a query concept. The similarity between the word image embeddings and the concept embedding is also measured as the dot product. In this case, it was found that $l_2$-normalizing the image features 124 led to significant improvements. The evaluation metric is also the mean average precision.

3. Image-to-image retrieval: one image is used as a query for retrieving other images that share at least one semantic concept. Images can be represented by the output of the FC7 layer, which corresponds to the latent space, but also by the output of the last layer, which would correspond to an "attribute scores" layer, where the image is represented by stacking the similarities between the image and all K concepts. This is a more challenging task, since two images that have many different associated concepts but share one of them are still considered a match. In this case, precision at k is reported, for values of k from 1 to 1,000.

Two baselines are used in the experiments for comparison purposes:

1. A two-step approach based on transcribing the word image and matching the transcriptions. For this task, the dictionary CNN of Jaderberg 2014 was used. The pretrained model that the authors made available was used. This model achieves around 95% transcription accuracy on the Oxford Synthetic dataset by choosing the right transcription out of a pool of 90,000 candidates. In this baseline, the model is first used to choose the most likely transcription of a given image, and then concepts extracted from WordNet are propagated using that transcription. This allows matching an image with concepts, and to perform both image-to-concept and query-by-image retrieval using inverted indices.

2. Output activations of the penultimate (FC7) layer of the same model are used as a feature representation (CNN-$Dict_7$) of the word images (4,096 dimensions). This is a strong feature representation that encodes information about the characters of the word. These features can subsequently be used for image-to-image retrieval, or for concept prediction after learning a linear classifier on top.

The effect of inaccurate cropping of the word images was also evaluated. In most realistic scenarios involving end-to-end tasks, it is common to localize and crop the word images out of larger images. Even though localization techniques have improved in recent years, localization is still inexact at best. To test the effect of this, as a surrogate of text localization, random crops of the word images were performed by randomly removing up to 20% of the image from left and right and up to 20% of the image from top and bottom. All of these cropped images still have an intersection over union with the originals of larger or equal than $(1-0.2)^2=0.64$, and would be accepted as positive localizations using the standard localization threshold of 0.5.

Results

1. Image-to-Concept and Concept-to-Image Retrieval Tasks

The exemplary LEWIS approach was evaluated on the image-to-concept and concept-to-image tasks on the Oxford Synthetic dataset and the results compared with the two-step baseline. Results are shown in FIGS. 7-10 for image-to-concept (accurate localization), concept-to-image (accurate localization), image-to-concept (inaccurate localization), and concept-to-image (inaccurate localization). The bars represent the present method and the dots denote the two-step baseline.

For the accurately localized images (FIGS. 7 and 8), it can be seen that increasing the number of levels (i.e., by using more fine-grained concepts) generally leads to improved results. This is reasonable, as in the extreme case of one concept per word this is equivalent to the transcription problem addressed with a CNN. On the other hand, less depth implies more words per semantic concept. This leads to a more multimodal problem, where very different images have to be assigned to the same class, increasing the difficulty. Increasing the number of concepts K has a fairly limited impact. As the concepts are sorted by number of words assigned, the first concepts are more difficult than the subsequent ones, leading to a trade-off between having more concepts, but having these concepts being easier.

Compared to the two-step baseline, the method is slightly behind (about 2% absolute) on the image-to-concept task, but outperforms it on the concept-to-image task.

For the images with random crops (FIGS. 9 and 10), as expected, the two-step baseline recognition method performs poorly, while the present method is still able to detect key aspects of the word image and favor the appropriate concepts.

Figure 11:
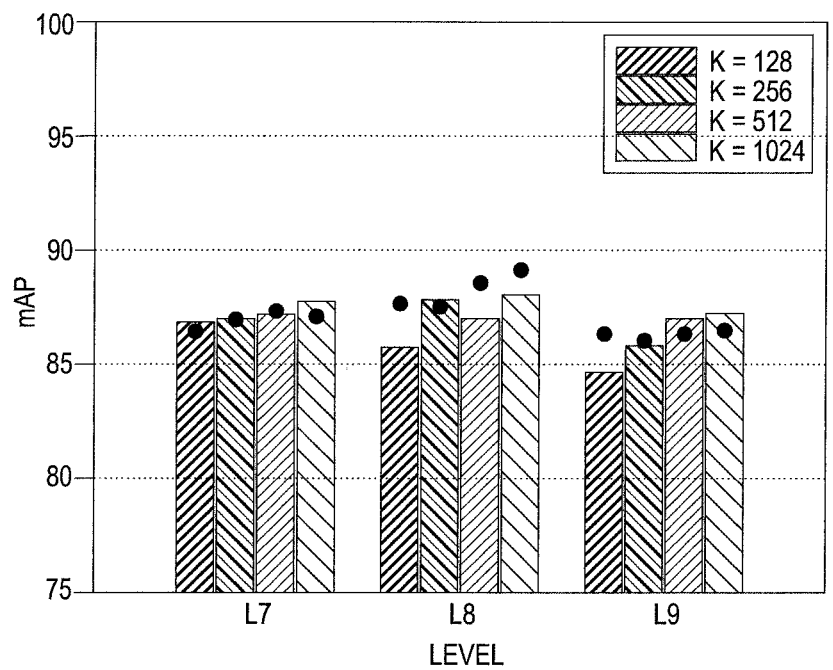
FIGS. 11-14 illustrate quantitative results on the Street View Text (SVT) IIIT database of word images and 5K-word (IIIT5K) dataset of cropped word images for different values of K and l), using the neural network trained on the Oxford Synthetic database of word images. Mean Average Precision is shown in FIG. 11 for image-to-concept and in FIG. 12 for concept-to-image results for the SVT dataset, and in FIGS. 13 and 14 for image-to-concept and concept-to-image results for the IIIT5K dataset.
Figure 12:
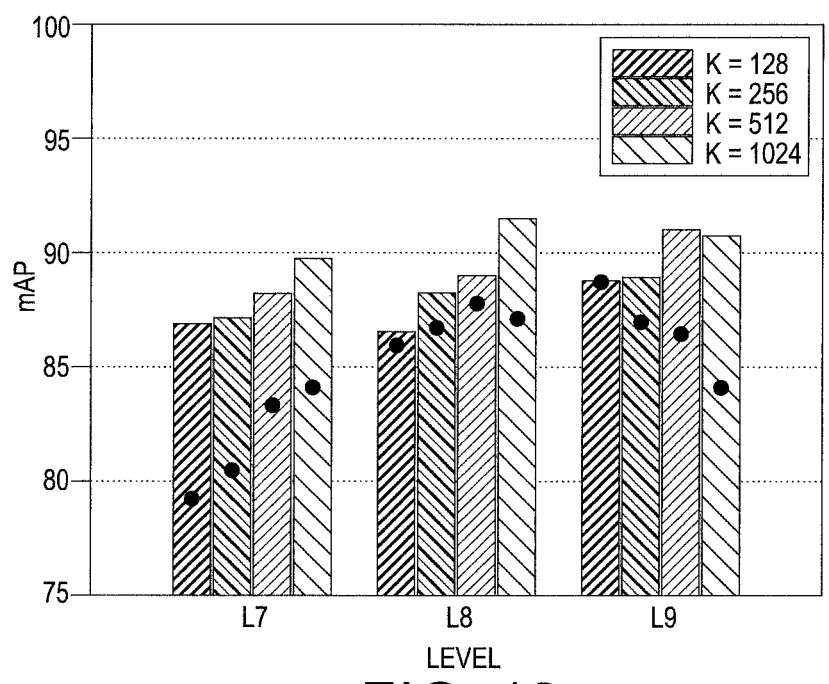
Figure 13:
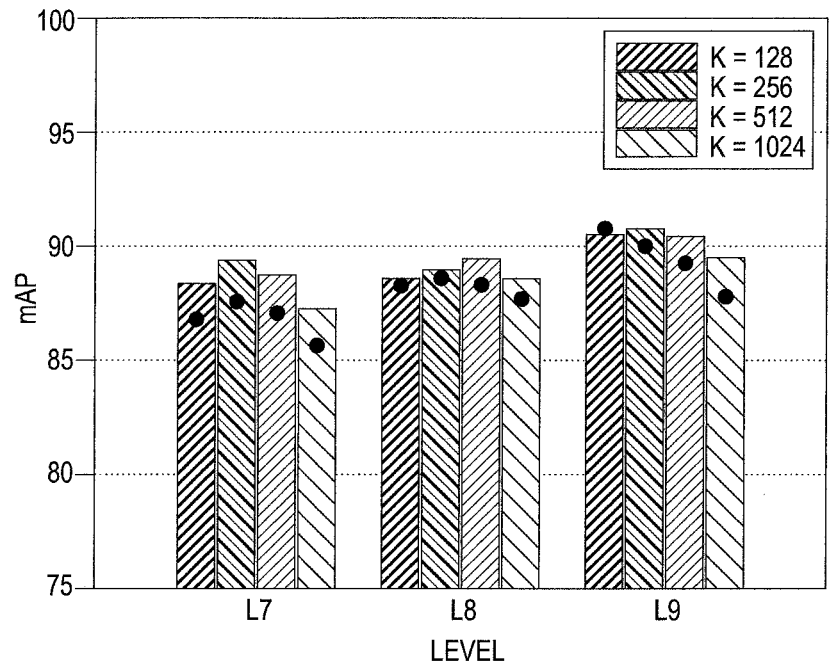
Figure 14:
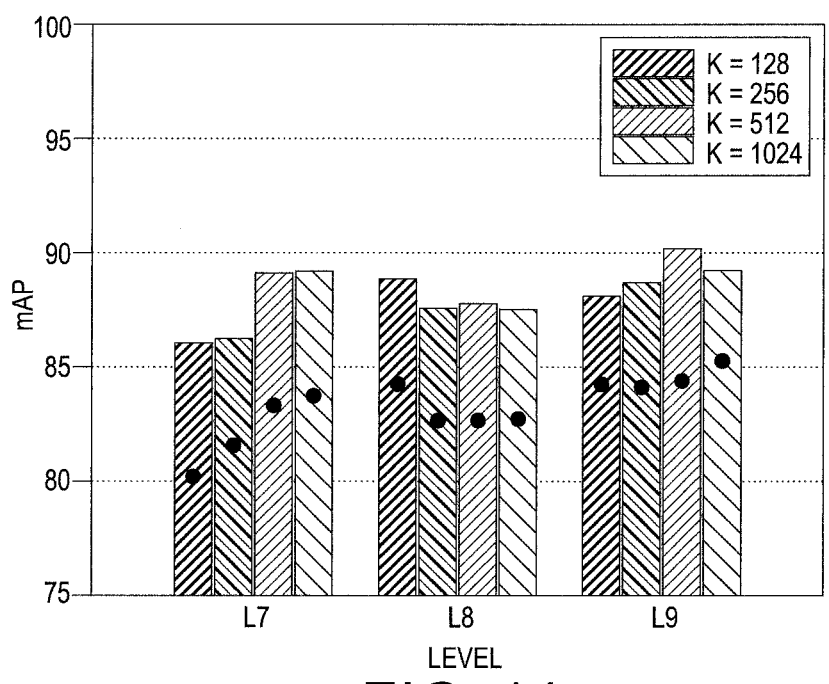

The method was also evaluated on the SVT and IIIT5K datasets, where the results exhibit a similar behavior. FIGS. 11-12 show the quantitative results obtained for image-to-concept and concept-to-image on the original word images for SVT, and FIGS. 13-14 for IIIT5K, which were all accurately cropped. The bars represent the accuracy of the exemplary method, while the dots represent the accuracy of the two-step baseline.

Despite having learned the models on Oxford Synthetic dataset, the results on SVT and IIIT5K are still very accurate.

The results suggest that learning the features with a deep architecture focused on the semantics is beneficial. This is demonstrated through the comparison with the second baseline: the CNN-$Dict_7$ features of the CNN of Jaderberg 2014, where a linear classifier was learned using the same ranking loss and data use to train LEWIS for a fair comparison. In this case, only an accuracy of 59% mean average precision was achieved on the image-to-concept task (K=128, l=7), compared to the 94% achieved when learning the features with the semantic goal in mind. This shows that, to perform these types of tasks, word image features that only encode character information are not particularly suitable, and that learning and encoding the semantic information directly in the representation is advantageous.

2. Image-to-Image Retrieval

In the image-to-image task, one image is used as a query and the goal is to return all the images that are related, i.e., that have at least one concept in common at a given level. The LEWIS features, extracted from the previous-to-last layer (FC7, 4,096 dimensions) and the last layer (FC8, K dimensions) are compared with the CNN-$Dict_7$ features of the CNN of Jaderberg 2014. All features are $l_2$-normalized and compared using the dot product.

TABLE 1 shows image-to-image retrieval with K=256 concepts at several levels using precision @ 1 to precision @ 1,000 as metrics. The results of the present method (LEWIS) are compared with the CNN-$Dict_7$ features of Jaderberg 2014.

TABLE 1

| Image-to-image retrieval with K = 256 concepts | | | | | |
|---|---|---|---|---|---|
| layer | | P @ 1 | P @ 10 | P @ 100 | P @ 1000 |
| l = 7 | CNN-$Dict_7$ | 96.1 | 84.0 | 19.0 | 6.0 |
| | LEWIS (FC7) | 94.4 | 90.6 | 33.6 | 16.0 |
| | LEWIS (FC8) | 93.4 | 90.5 | 49.9 | 37.7 |
| l = 8 | CNN-$Dict_7$ | 96.2 | 84.3 | 18.5 | 5.5 |
| | LEWIS (FC7) | 95.2 | 91.9 | 34.8 | 17.0 |
| | LEWIS (FC8) | 94.3 | 92.3 | 60.3 | 49.6 |
| l = 9 | CNN-$Dict_7$ | 96.7 | 85.6 | 18.3 | 6.1 |
| | LEWIS (FC7) | 95.6 | 92.8 | 33.9 | 18.3 |
| | LEWIS (FC8) | 95.0 | 93.1 | 61.1 | 53.0 |

At precision @ 1, the CNN-$Dict_7$ features obtain superior results, as they are returning another image with exactly the same word and they do this with better accuracy. However, as k increases and images with different words need to be returned, its accuracy plummets, as this representation only encodes information to recognize the exact word. On the other hand, the LEWIS embeddings still return meaningful results when k increases, even if they have not been learned explicitly for this type of retrieval task.

3. Qualitative Results

FIG. 15 illustrates some qualitative results for the image-to-concept task, using K=128 classes and depth levels 7 or 8. In many cases, the predicted concepts are very related to the query even if they do not appear in the ground truth annotations, showing that semantically similar concepts are being embedded in neighboring locations of the space.

FIG. 16 shows qualitative results for the concept-to-image tasks with K=128 and concepts from levels 7 and 8, showing once again that images with very different transcriptions are still embedded close to their related concepts. For every concept, images of unique words returned in the first positions are shown. No negative image was ranked ahead of any of these images. Additionally, the results show the effects of combining concepts, by adding or subtracting the scores, to make more complex searches that still return meaningful results.

4. Generalization

One of the advantages of the method with respect to the baseline is that concepts can be encoded and found for word images 12 that have not been observed during training or where the words do not appear in WordNet. For example, the qualitative results of FIG. 15 suggest that some concepts are predicted based on the roots of similar words, as those concepts did not appear in the ground truth of the words. This is consistent with the results using random crops, where reasonable results were obtained even if part of the word was missing. This was tested explicitly by training a network on a subset of the training data (90% of words) and testing on a disjoint set (10% of words), where none of the testing words was observed during training. In this case, the results dropped from around 90% down to 56.1% (K=128, l=7) and 61.9% (K=256, l=7) in the image-to-concept task, and to 40.6% and 52.8% in the concept-to-image. Although there is a significant drop in accuracy, the results are still surprisingly high, given that this is a very arduous zero-shot problem. This shows that some generalization to new words is indeed achieved, likely through common roots of words.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A semantic comparison method, comprising:
providing training word images labeled with concepts from a set of K concepts;
with a convolutional neural network and the training word images and their labels, learning a first embedding function for embedding word images in a semantic subspace of D dimensions, where D is at least 500, and learning a second embedding function for embedding the concepts in the semantic subspace, the convolutional neural network including a sequence of at least two convolutional layers and a sequence of at least two fully-connected layers, an output dimensionality of a last of the fully connected layers being K;
receiving a query comprising at least one test word image or at least one concept;
(i) where the query comprises at least one test word image:
generating a representation of each of the at least one test word image, comprising embedding the test word image in the semantic subspace with the first embedding function, and
computing a comparison, the computing including computing a dot product or Euclidean distance between:
a) at least one of the test word image representations, and
b) at least one of the embedded concepts;
(ii) where the query comprises at least one concept:
providing a representation of the at least one concept generated by embedding each of the at least one concept with the second embedding function, and
computing a comparison, the computing including computing a dot product or Euclidean distance between:
a) at least one of the concept representations, and
b) at least one word image representation, each of the at least one word image representation being generated by embedding the respective word image with the first embedding function; and
outputting information based on the comparison.

2. The method of claim 1, wherein at least one of the learning of the first embedding function, generating of the representation of each of the at least one test word image, providing a representation of the at least one concept, and computing of the comparison is performed with a processor.

3. The method of claim 1, wherein the embedding of the at least one test word image is performed without generating a transcription of the test word image.

4. The method of claim 1, wherein the providing of the labeled training word images comprises for each of a set of training word images labeled with respective entity names, accessing a hierarchy of hypernyms with the entity name to identify a concept which is a hypernym of the entity name and labeling the training word image with the concept.

5. The method of claim 1, wherein the learning of the first embedding function for embedding word images in the semantic subspace into which the concepts are embedded with a second embedding function includes computing a ranking loss objective function that favors the concepts that are relevant to a test image being ranked ahead of those that are not relevant.

6. The method of claim 5, wherein the ranking loss objective function is a weighted approximate pairwise ranking loss (WARP).

7. The method of claim 1, wherein the embedding of each of the at least one word image is based on the activations of a first selected one of the fully-connected layers of the trained convolutional neural network.

8. The method of claim 7, wherein the first selected fully-connected layer comprises one of a penultimate fully-connected layer and the last fully-connected layer of the convolutional neural network.

9. The method of claim 1, wherein the embedding of each of the at least one concept is constructed with the weights of a second selected layer of the fully-connected layers of the trained convolutional neural network.

10. The method of claim 9, wherein the second selected fully-connected layer is the last fully-connected layer of the convolutional neural network.

11. The method of claim 1, wherein the query comprises the at least one test word image, the method further comprising identifying at least one most related concept to the test image, based on the comparison.

12. The method of claim 1, wherein the query comprises the at least one concept, the method further comprising identifying at least one most related image to the at least one concept, based on the comparison.

13. The method of claim 1, further comprising identifying the most related images to a test image, based on the comparison, where images are related if they have concepts in common.

14. A computer program product comprising a non-transitory recording medium storing instructions, which when executed on a computer, causes the computer to perform the method of claim 1.

15. The semantic comparison method of claim 1, wherein the learning of the first embedding function comprises:

learning parameters of a neural network with training word images labeled with concepts from the set of concepts, the neural network being learned to embed the training word images and the concepts into a common semantic space with a ranking loss objective function which favors the concepts that are relevant to a training word image being ranked, by the neural network, ahead of those that are not relevant.

16. The method of claim 1, wherein the first embedding function is constructed with activations of a penultimate one of the fully-connected layers and the second embedding function is constructed with weights of a last of the fully-connected layers.

17. A semantic comparison system comprising:
memory which stores:
   training word images labeled with semantic concepts from a set of K concepts, each of the semantic concepts being associated with a respective set of entity names, each of the training word images being an image of one of the entity names in the respective set of entity names associated with the semantic concept with which the training word image is labeled;
   a learning component which learns a first embedding function, with the training word images and their labels, for embedding word images in a semantic subspace into which the concepts are embedded with a second embedding function, wherein the learning component learns the first and second embedding functions with a convolutional neural network, the convolutional neural network including a sequence of at least two convolutional layers and a sequence of at least two fully-connected layers, an output dimensionality of a last of the fully connected layers being K;
   an embedding component which:
      receives a query comprising at least one test word image, and
      generates a representation of each of the at least one test word image, comprising embedding the test word image in the semantic subspace with the first embedding function, and
   a semantic comparison component which computes a comparison between at least one of the test word image representations and at least one of the embedded concepts; and
   an output component which outputs information based on the comparison; and
   a hardware processor in communication with the memory for implementing the learning component, embedding component, semantic comparison component, and output component.

18. The system of claim 17, wherein the computing of the comparison comprises computing a dot product or Euclidean distance between at least one test image representation and at least one concept representation.

19. The semantic comparison system of claim 17, wherein the learning component learns parameters of the neural network with the training word images labeled with the concepts from the set of concepts, the neural network being learned to embed the training word images and the concepts into a common semantic space with a ranking loss objective function which favors the concepts that are relevant to a word image being ranked, by the neural network, ahead of those that are not relevant.

20. The system of claim 19, further comprising:
   a concept mining component which identifies concepts for entity names of the training word images.

21. A semantic comparison system comprising:
memory which stores:
   training word images labeled with semantic concepts, each of the semantic concepts being associated with a respective set of entity names, each of the training word images being an image of one of the entity names in the respective set of entity names associated with the semantic concept with which the training word image is labeled;
   a learning component which learns a first embedding function, with the training word images and their labels, for embedding word images in a semantic subspace into which the concepts are embedded with a second embedding function, wherein the learning component learns the first and second embedding functions with a convolutional neural network, the convolutional neural network including a sequence of fully-connected layers, the first embedding function being constructed with activations of a selected one of the fully-connected layers and the second embedding function being constructed with weights of a last of the fully-connected layers;
   an embedding component which:
      receives a query comprising at least one concept, and
      provides a representation of each of the at least one concept, comprising embedding the concept in the semantic subspace with the second embedding function, and
   a semantic comparison component which computes a comparison between at least one of the concept representations and at least one word image representation, each of the at least one word image representation being generated by embedding the respective word image with the first embedding function; and
   an output component which outputs information based on the comparison; and
   a hardware processor in communication with the memory for implementing the learning component, embedding component, semantic comparison component, and output component.

* * * * *